(12) United States Patent
Ryu et al.

(10) Patent No.: US 9,560,573 B2
(45) Date of Patent: Jan. 31, 2017

(54) RELAY LINK COMMUNICATION

(71) Applicant: QUALCOMM Incorporated, San Diego, CA (US)

(72) Inventors: Jung Ryu, Jersey City, NJ (US); Sundar Subramanian, Bridgewater, NJ (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/693,559

(22) Filed: Apr. 22, 2015

(65) Prior Publication Data

US 2016/0100347 A1   Apr. 7, 2016

Related U.S. Application Data

(60) Provisional application No. 62/059,066, filed on Oct. 2, 2014.

(51) Int. Cl.
*H04W 40/22* (2009.01)
*H04W 76/02* (2009.01)
*H04L 12/709* (2013.01)
*H04W 16/28* (2009.01)
*H04W 88/06* (2009.01)
*H04W 92/20* (2009.01)

(52) U.S. Cl.
CPC ........... *H04W 40/22* (2013.01); *H04L 45/245* (2013.01); *H04W 76/026* (2013.01); *H04W 16/28* (2013.01); *H04W 88/06* (2013.01); *H04W 92/20* (2013.01)

(58) Field of Classification Search
CPC ..... H04W 40/22; H04W 76/025; H04W 88/10
See application file for complete search history.

(56) References Cited

U.S. PATENT DOCUMENTS

| 8,391,239 B2 | 3/2013 | Tenny et al. |
| 8,391,918 B2 | 3/2013 | Ekici et al. |
| 8,817,644 B2 | 8/2014 | Etemad |
| 2007/0178880 A1* | 8/2007 | Saito .................. H04B 7/2606 455/405 |

(Continued)

FOREIGN PATENT DOCUMENTS

WO   WO-2013086410 A2   6/2013

OTHER PUBLICATIONS

Ghimire J., et al., "Why are Relays not Always Good for You? Performance of Different Relay Deployment Configurations in a Heterogeneous Network", 2014 12TH International Symposium on Modeling and Optimization in Mobile, Ad Hoc, and Wireless Networks (WiOpt), IFIP, May 12, 2014 (May 12, 2014), XP032616556, pp. 333-340, DOI: 10.11 09/WIOPT.2014.6850317 [retrieved on Jul. 8, 2014].

(Continued)

*Primary Examiner* — Kashif Siddiqui
(74) *Attorney, Agent, or Firm* — Loza & Loza LLP

(57) ABSTRACT

A link based on one radio access technology (RAT) is used to supplement the operation of another RAT. For example, in a user equipment (UE) device that can access both long term evolution (LTE) and millimeter wave (mmW) networks, the UE may use an LTE network to relay information between the UE and the mmW network.

45 Claims, 30 Drawing Sheets

(56) References Cited

U.S. PATENT DOCUMENTS

| | | | | |
|---|---|---|---|---|
| 2007/0190934 A1* | 8/2007 | Kim | ................... | H04B 7/15557 |
| | | | | 455/7 |
| 2010/0290430 A1* | 11/2010 | Lee | ..................... | H04W 36/385 |
| | | | | 370/331 |
| 2011/0021193 A1* | 1/2011 | Hong | ..................... | H04B 7/155 |
| | | | | 455/435.1 |
| 2011/0182174 A1* | 7/2011 | Pi | .......................... | H04W 88/10 |
| | | | | 370/229 |
| 2013/0242783 A1 | 9/2013 | Horn et al. | | |
| 2014/0010086 A1* | 1/2014 | Etemad | ................ | H04B 7/0632 |
| | | | | 370/235 |
| 2014/0171094 A1* | 6/2014 | Noh | ...................... | H04W 40/22 |
| | | | | 455/452.1 |
| 2016/0007371 A1* | 1/2016 | Pietraski | ........... | H04W 72/1263 |
| | | | | 370/315 |
| 2016/0087877 A1* | 3/2016 | Ryu | ........................ | H04L 45/22 |
| | | | | 370/329 |

OTHER PUBLICATIONS

International Search Report and Written Opinion—PCT/US2015/049502—ISA/EPO—Dec. 7, 2015.

\* cited by examiner

RELAY LINK COMMUNICATION

CROSS-REFERENCE TO RELATED APPLICATION(S)

This application claims priority to and the benefit of provisional patent application No. 62/059,066 filed in the U.S. patent office on Oct. 2, 2014, the entire content of which is incorporated herein by reference.

BACKGROUND

Field of the Disclosure

Aspects of the disclosure relate generally to wireless communication, and more specifically, but not exclusively, to communication via a relay link.

Description of Related Art

In some types of wireless communication networks, an access terminal such as a user equipment (UE) communicates with one or more network base stations. In some scenarios, different base stations may use different radio access technologies (RATs). The term RAT refers to the physical connection for a radio-based communication network. Examples of different RATs include, without limitation, third generation partnership project (3GPP) technologies (e.g., third generation technology (3G), fourth generation technology (3G), and fifth generation technology (5G)), millimeter wave (mmW) technology, Bluetooth technology, and Wi-Fi technology. In a millimeter wave (mmW) system, multiple antennas are used for beamforming (e.g., in the range of 30 GHz, 60 GHz, etc.).

Typically, different RATs have different capabilities. For example, a UE may have the capability to access both a long term evolution (LTE) network and a millimeter wavelength (mmW) network. The downlink/uplink (DL/UL) access link between an LTE base station and the UE is typically more reliable than the access link between a mmW base station and the UE. However, the LTE link typically has lower capacity than the mmW link.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

The disclosure relates in some aspects to using a link based on one RAT to supplement the operation of another RAT. For example, in a UE that can access both LTE and mmW networks, the UE may use an LTE link to communicate information to/from a mmW network.

The disclosure relates in some aspects to requesting a base station that includes circuitry for one RAT to establish a relay link between an access terminal (e.g., a UE) and a base station that includes circuitry for another RAT. For example, in a user equipment (UE) that can access both a long term evolution (LTE) network and a millimeter wave (mmW) network, the UE may request the LTE network to relay information between the UE and the mmW network.

In one aspect, the disclosure provides an apparatus configured for communication that includes a memory device and a processing circuit coupled to the memory device. The processing circuit is configured to: establish a communication link between an access terminal and a first base station that includes circuitry for a first radio access technology (RAT); send a request to the first base station to establish a relay link through the first base station between the access terminal and a second base station that includes circuitry for a second RAT different from the first RAT; and communicate with the second base station via the relay link through the first base station.

Another aspect of the disclosure provides a method of communication including: establishing a communication link between an access terminal and a first base station that includes circuitry for a first radio access technology (RAT); sending a request to the first base station to establish a relay link through the first base station between the access terminal and a second base station that includes circuitry for a second RAT different from the first RAT; and communicating with the second base station via the relay link through the first base station.

Another aspect of the disclosure provides an apparatus configured for communication. The apparatus including means for: establishing a communication link between an access terminal and a first base station that includes circuitry for a first radio access technology (RAT); means for sending a request to the first base station to establish a relay link through the first base station between the access terminal and a second base station that includes circuitry for a second RAT different from the first RAT; and means for communicating with the second base station via the relay link through the first base station.

Another aspect of the disclosure provides a non-transitory computer-readable medium storing computer-executable code, including code to: establish a communication link between an access terminal and a first base station that includes circuitry for a first radio access technology (RAT); send a request to the first base station to establish a relay link through the first base station between the access terminal and a second base station that includes circuitry for a second RAT different from the first RAT; and communicate with the second base station via the relay link through the first base station.

In one aspect, the disclosure provides an apparatus configured for communication that includes a memory device and a processing circuit coupled to the memory device. The processing circuit is configured to: establish a first communication link between a first base station that includes circuitry for a first radio access technology (RAT) based on millimeter wave (mmW) signaling and a second base station that includes circuitry for a second radio access technology (RAT) different from the first RAT; receive an indication that a relay link between the first base station and an access terminal is established via the first communication link; communicate with the access terminal via the relay link; and establish a second communication link with the access terminal via the first RAT.

Another aspect of the disclosure provides a method of communication including: establishing a first communication link between a first base station that includes circuitry for a first radio access technology (RAT) based on millimeter wave (mmW) signaling and a second base station that includes circuitry for a second radio access technology (RAT) different from the first RAT; receiving an indication that a relay link between the first base station and an access terminal is established via the first communication link; communicating with the access terminal via the relay link;

and establishing a second communication link with the access terminal via the first RAT.

Another aspect of the disclosure provides an apparatus configured for communication. The apparatus including: means for establishing a first communication link between a first base station that includes circuitry for a first radio access technology (RAT) based on millimeter wave (mmW) signaling and a second base station that includes circuitry for a second radio access technology (RAT) different from the first RAT; means for receiving an indication that a relay link between the first base station and an access terminal is established via the first communication link; means for communicating with the access terminal via the relay link; and means for establishing a second communication link with the access terminal via the first RAT.

Another aspect of the disclosure provides a non-transitory computer-readable medium storing computer-executable code, including code to: establish a first communication link between a first base station that includes circuitry for a first radio access technology (RAT) based on millimeter wave (mmW) signaling and a second base station that includes circuitry for a second radio access technology (RAT) different from the first RAT; receive an indication that a relay link between the first base station and an access terminal is established via the first communication link; communicate with the access terminal via the relay link; and establish a second communication link with the access terminal via the first RAT.

In one aspect, the disclosure provides an apparatus configured for communication that includes a memory device and a processing circuit coupled to the memory device. The processing circuit is configured to: establish a first communication link between a first base station that includes circuitry for a first radio access technology (RAT) and an access terminal; receive a request from the access terminal for the first base station to establish a relay link through the first base station between the access terminal and a second base station that includes circuitry for a second RAT different from the first RAT; establish a second communication link with the second base station; establish the relay link via the first communication link and the second communication link; and communicate information between the access terminal and the second base station via the relay link.

Another aspect of the disclosure provides a method of communication including: establishing a first communication link between a first base station that includes circuitry for a first radio access technology (RAT) and an access terminal; receiving a request from the access terminal for the first base station to establish a relay link through the first base station between the access terminal and a second base station that includes circuitry for a second RAT different from the first RAT; establishing a second communication link with the second base station; establishing the relay link via the first communication link and the second communication link; and communicating information between the access terminal and the second base station via the relay link.

Another aspect of the disclosure provides an apparatus configured for communication. The apparatus including: means for establishing a first communication link between a first base station that includes circuitry for a first radio access technology (RAT) and an access terminal; means for receiving a request from the access terminal for the first base station to establish a relay link through the first base station between the access terminal and a second base station that includes circuitry for a second RAT different from the first RAT; means for establishing a second communication link with the second base station; means for establishing the relay link via the first communication link and the second communication link; and means for communicating information between the access terminal and the second base station via the relay link.

Another aspect of the disclosure provides a non-transitory computer-readable medium storing computer-executable code, including code to: establish a first communication link between a first base station that includes circuitry for a first radio access technology (RAT) and an access terminal; receive a request from the access terminal for the first base station to establish a relay link through the first base station between the access terminal and a second base station that includes circuitry for a second RAT different from the first RAT; establish a second communication link with the second base station; establish the relay link via the first communication link and the second communication link; and communicate information between the access terminal and the second base station via the relay link.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
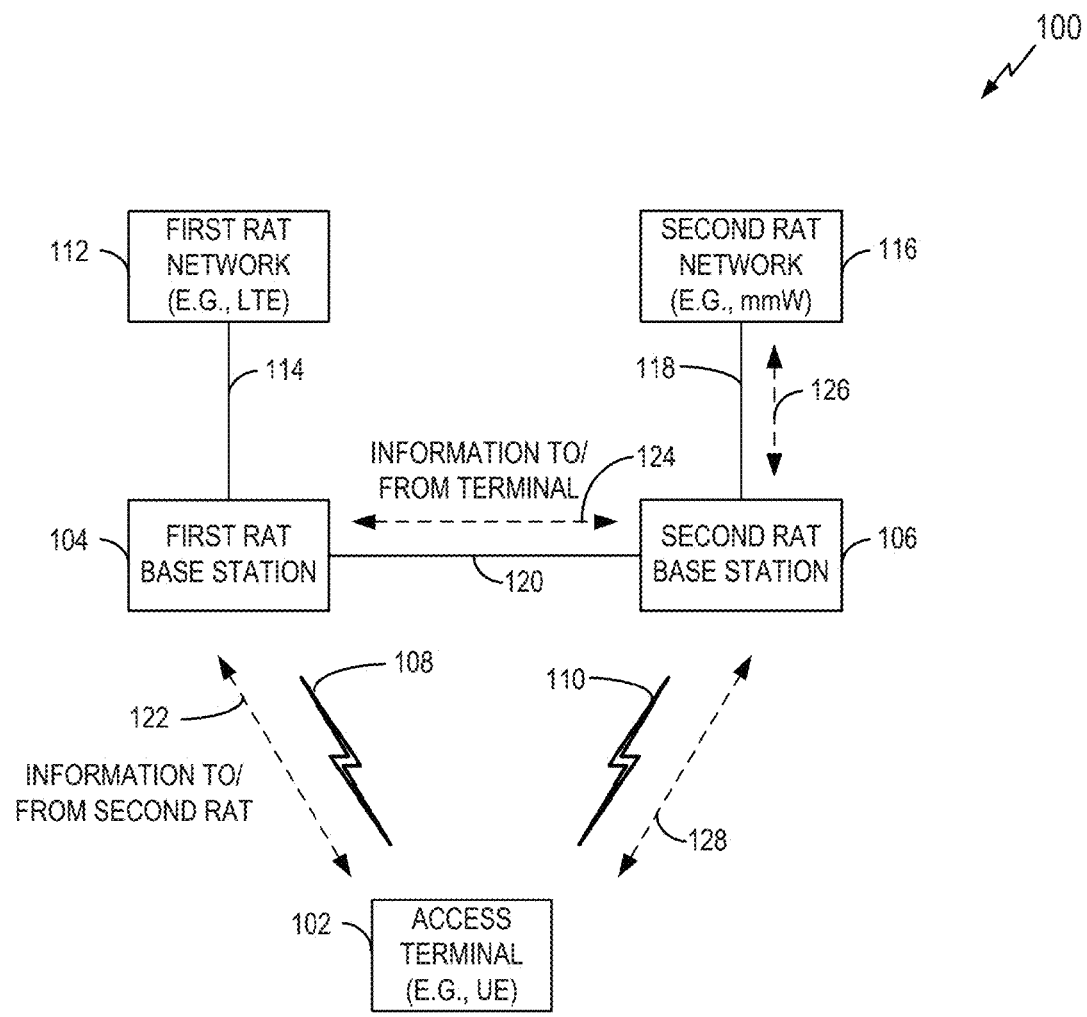
FIG. 1 illustrates an example of a communication system where one RAT is used to support communication associated with another RAT in accordance with some aspects of the disclosure.

The disclosure relates in some aspects to leveraging the reliability of a first RAT (e.g., an LTE network) to supplement the capability of a second RAT (e.g., a mmW network) and to improve the overall performance of the second RAT. FIG. 1 illustrates a communication system 100 where an access terminal (e.g., a UE) 102 communicates with a first base station 104 that includes circuitry for a first RAT (e.g., the base station uses LTE technology or some other RAT to communicate) and a second base station 106 that includes circuitry for a second RAT (e.g., the base station uses mmW technology or some other RAT to communicate). To this end, communication between the access terminal 102 and the first base station 104 employs circuitry for first RAT signaling 108, while communication between the access terminal 102 and the second base station 106 employs circuitry for second RAT signaling 110.

The first base station 104 communicates with other components of a first RAT network 112 via a link 114 and the second base station 106 communicates with other components of a second RAT network 116 via a communication link 118. In addition, the first and second base stations 104 and 106 communicate via a communication link 120.

In accordance with the teachings herein, one RAT may be used to communicate information associated with another RAT. As indicated by the dashed lines 122 and 124, information may be sent between the access terminal 102 and the second base station 106 via the first RAT signaling 108 and the communication link 120. In addition, as indicated by the dashed lines 122, 124, and 126, information may be sent between the access terminal 102 and the second RAT network 116 via the first RAT signaling 108, the communication link 120, and the communication link 118. In response to this communication, the second base station 106 or the second RAT network 116 may communicate information to the access terminal 102 via the second RAT signaling 110 (as indicated by the dashed line 128) or via the first base station (e.g., as indicated by the dashed lines 122, 124, and 126).

Because the access terminal 102 (e.g., a UE) can access both the first RAT network 112 and the second RAT network 116, the capability of one network may be used to supplement the operation of the other network to improve performance. In an example implementation, an LTE network and a mmW network are connected by an X2 interface. In this case, downlink (DL) traffic from the LTE network can be offloaded to the mmW network to take advantage of the relatively high DL capacity of the mmW network. For example, a UE may want to download a large file from the Internet. The file may initially arrive at the LTE network to be transmitted to the UE, but the LTE network may forward the file to the mmW network over the X2 interface and request the mmW base station to transmit the file to the UE over its high capacity mmW channel. As another example, since the LTE link is highly reliable, critical control information may be transmitted over the LTE link instead of a less reliable mmW link. As a specific example, a command to switch a beamforming direction for the mmW network that is important for optimal operation of the mmW network may be sent by the mmW base station to the LTE base station over the high capacity, low latency X2 interface and be relayed to the UE over the highly reliable LTE DL channel.

Figure 2:
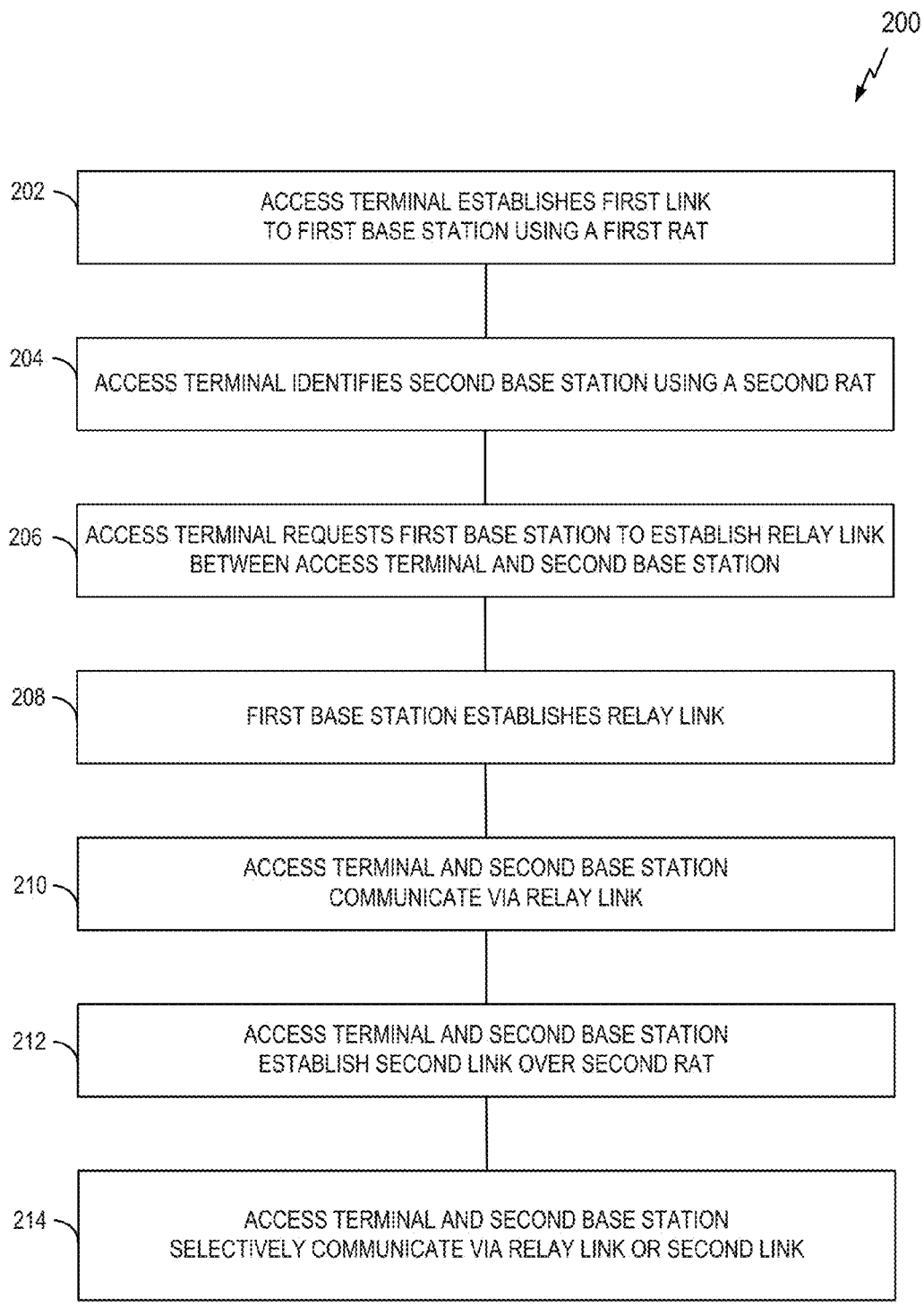
FIG. 2 illustrates an example of a process for relay link communication in accordance with some aspects of the disclosure.

With the above in mind, FIG. 2 illustrates a process 200 for relay-based communication in accordance with some aspects of the disclosure. The process 200 may be implemented by any suitable apparatuses capable of supporting communication-related operations.

At block 202, an access terminal establishes a first link to a first base station using a first RAT. For example, a UE may connect to an LTE eNode B (eNB) base station.

At block 204, the access terminal identifies a second base station using a second RAT. For example, a UE may determine that it is within the coverage area of a mmW base station.

At block 206, the access terminal requests the first base station to establish a relay link between the access terminal and the second base station. For example, a UE may send a message to an LTE eNB, where the message requests the LTE eNB to set up a relay link between the UE and a mmW base station.

At block 208, the first base station establishes the relay link. For example, an LTE eNB may set up a channel whereby information received from a designated UE via an LTE link may be relayed to a designated mmW base station via an X2 interface. In addition, on this channel, information received from a designated mmW base station via an X2 interface may be relayed to a designated UE via an LTE link.

At block 210, the access terminal and the second base station communicate via the relay link. For example, a UE may send information to a mmW base station via the LTE network and the mmW base station may send information to the UE via the LTE network.

At block 212, the access terminal and the second base station establish a second link over a second RAT. For example, a UE may connect to a mmW base station via mmW signaling.

At block 214, the access terminal and the second base station selectively communicate via the relay link or the second link. For example, a UE or a mmW base station may determine whether to (e.g., elect to) send some types of traffic over a relay link and other types of traffic over a mmW link. As another example, depending on channel conditions, a UE or a mmW base station may determine whether to (e.g., elect to) send traffic either over a relay link or a mmW link.

Several additional aspects of the disclosure will be described with reference to FIGS. 3-9. For purposes of illustration, these figures may illustrate various components in the context of mmW technology and/or LTE technology.

It should be appreciated, however, that the teachings herein may be employed in other types of radio technologies and architectures (e.g., other types of RATs). For example, in various implementations, a base station constructed in accordance with the teachings herein could include circuitry for a second generation (2G) RAT, a 3G RAT, a 4G RAT, a 5G RAT, a mmW RAT, a Wi-Fi RAT, a Bluetooth RAT, and so-on. Similarly, an access terminal could include circuitry for one or more of a 2G RAT, a 3G RAT, a 4G RAT, a 5G RAT, a mmW RAT, a Wi-Fi RAT, a Bluetooth RAT, and so-on. Also, various operations may be described as being performed by specific types of components (e.g., base stations, client devices, peer-to-peer devices, user equipment (UE), and so on). It should be understood that these operations can be performed by other types of devices. To reduce the complexity of these figures, only few example components are shown. However, the teachings herein can be implemented using a different number of components or other types of components.

Figure 3:
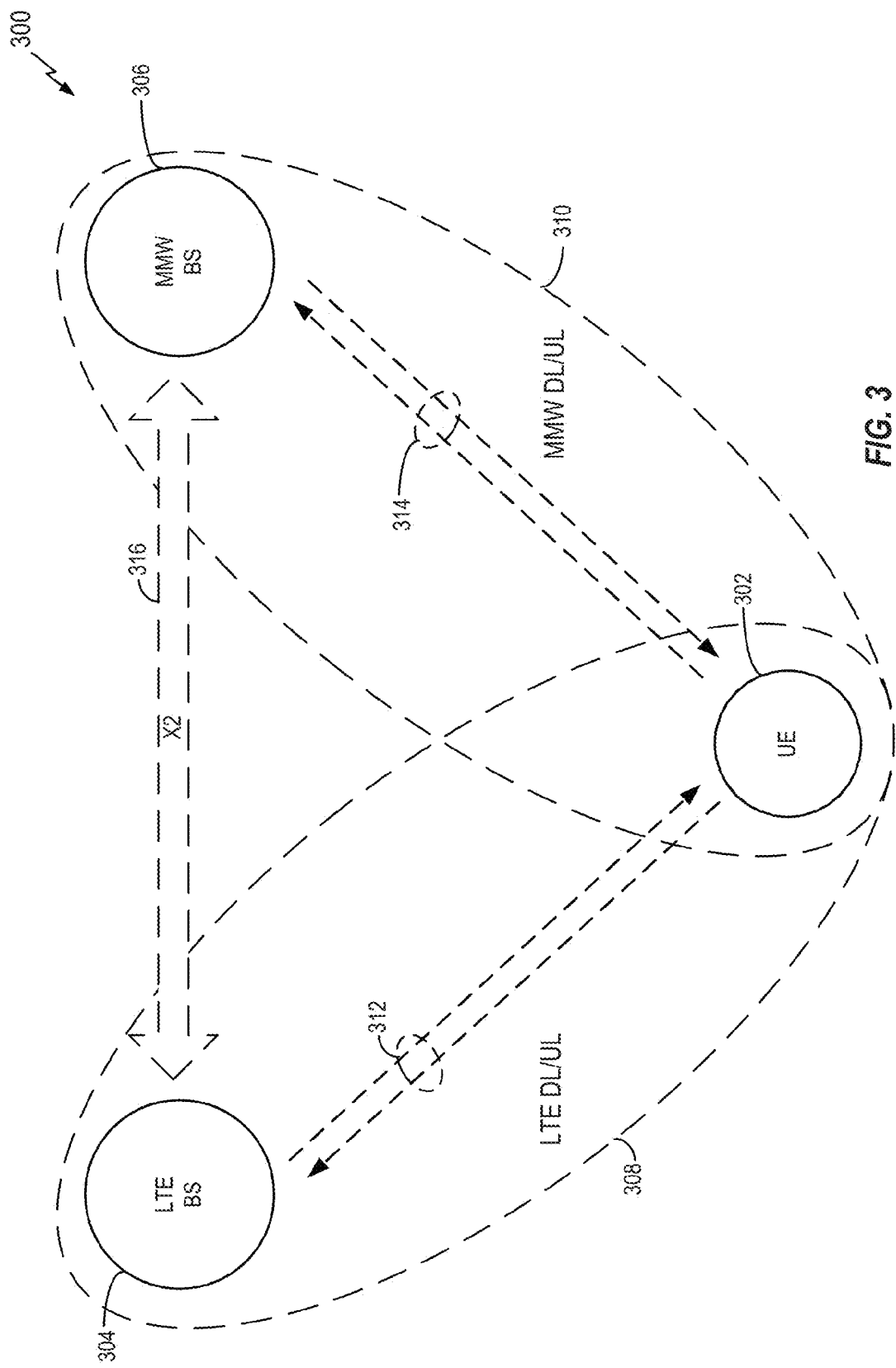
FIG. 3 illustrates an example of a communication system in which aspects of the disclosure may be implemented.

FIG. 3 illustrates a portion of a communication system 300 that includes a UE 302, an LTE base station (LTE BS) 304, and a mmW base station (mmW BS) 306. The UE 302 is within the coverage area 308 of the LTE base station 304 and may therefore communicate with (e.g., connect to) the LTE base station 304. The LTE network communication between the UE 302 and the LTE base station 304 is via an LTE uplink (UL) and an LTE downlink (DL), collectively represented in FIG. 3 by the dashed lines 312. The UE 302 is also within the coverage area 310 of the mmW base station 306 and may therefore communicate with (e.g., connect to) the mmW base station 306. The mmW network communication between the UE 302 and the mmW base station 306 is via a mmW uplink (UL) and a mmW downlink (DL), collectively represented in FIG. 3 by the dashed lines 314. The LTE base station 304 and the mmW base station 306 communicate via an X2 interface 316.

In some aspects, the LTE links may be more reliable than the mmW links.

However, the LTE links may have lower throughput. Thus, the LTE links are preferred over the mmW links in some scenarios, while the mmW links are preferred over the LTE links in other scenarios.

The mmW links are beamformed. Typically, these links are monitored and adjusted frequently. The mmW links are high throughput, and are thus preferred in some scenarios.

The X2 interface 316 is a high speed link that is used for communication between the LTE base station 304 and the mmW base station 306. Typically, the X2 interface 316 has relatively high throughput and low latency.

The disclosure relates in some aspects to using an LTE DL/UL link of an LTE base station and a high capacity, low latency inter-base station communication link to relay information (e.g., control information) between a mmW base station and a UE via the LTE base station. For example, the UE may have a need to send control information to the mmW base station. This information may include, without limitation, beam search results, scheduling requests, request to switch beamforming directions, and so on.

This information may be time sensitive (e.g., delay sensitive). For example, beam search results for the mmW uplink channel may need to be quickly sent to the mmW base station from the UE. However, the mmW uplink channel might not be available. For example, a beam search might not have been completed. As another example, the beamforming direction may have suddenly changed and the mmW base station might not be aware of this change. As yet another example, the uplink mmW channel may be useable, but the available resources may be insufficient to efficiently transfer the uplink information. For example, the UE may have a lot of control information to transmit to the mmW base station or the mmW base station may be busy doing other tasks.

In accordance with the teachings herein, an LTE uplink channel (either control or data channel) is established for routing uplink control information between the UE and the mmW base station. The LTE base station forwards the control information to the mmW base station using an X2 interface between the LTE base station and the mmW base station. Upon receiving the control information via the LTE base station, the mmW base station may perform tasks related to the control information. For example, the mmW base station may reconfigure its DL/UL beamforming settings when communicating with the UE. The mmW base station may transmit the result of the action it has taken directly to the UE on the mmW DL channel or indirectly to the LTE base station over the X2 interface to be forwarded to the UE on the LTE DL channel. The supplemental UL channel via the LTE base station and the X2 interface allows less frequent beamforming monitoring and/or adjustment for the mmW UL channel.

Figure 4:
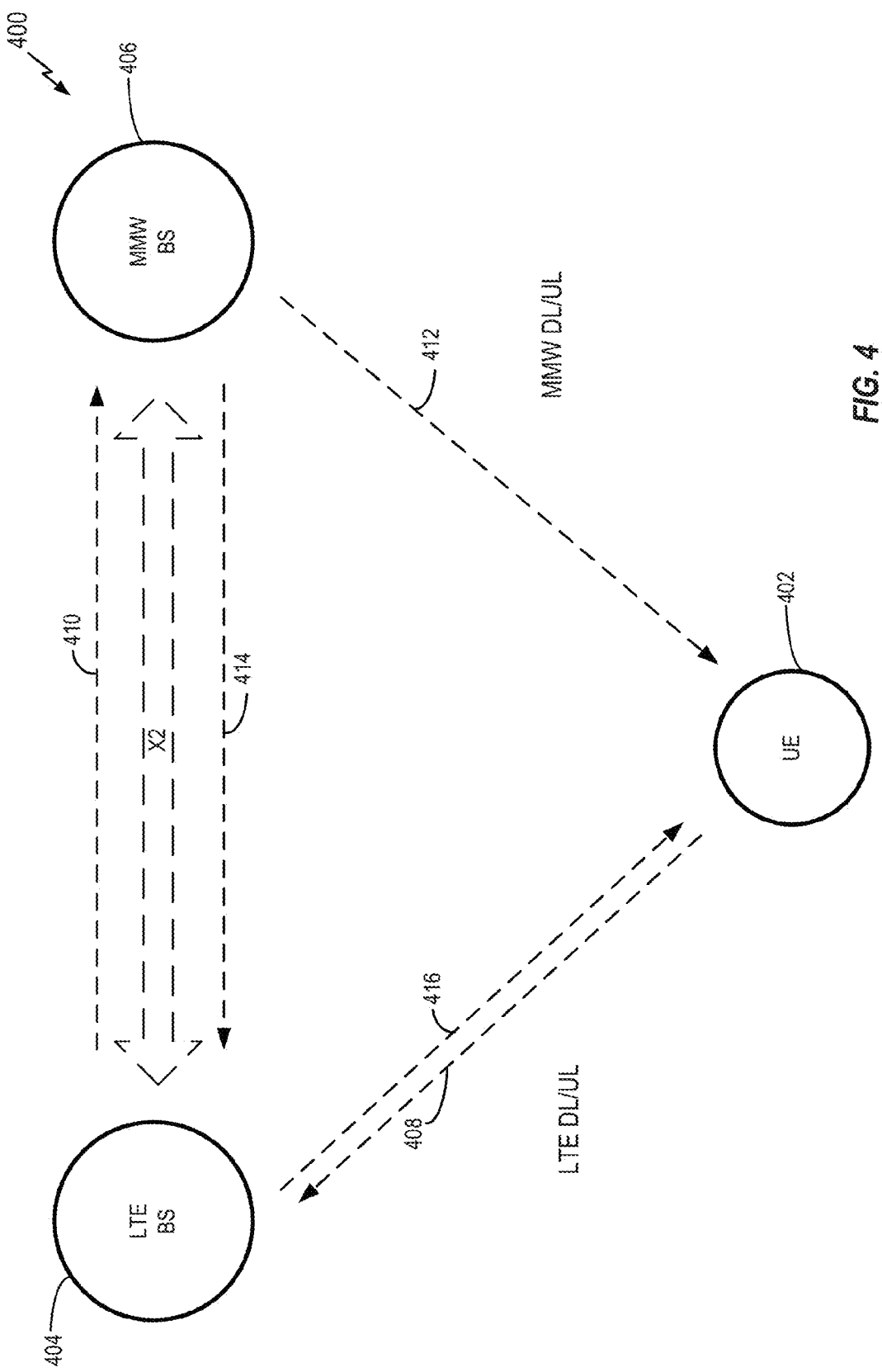
FIG. 4 illustrates an example of a communication system where an LTE base station is used to support communication between a UE and a mmW base station in accordance with some aspects of the disclosure.

Several sample operations will now be described with reference to FIG. 4. FIG. 4 illustrates a portion of a communication system 400 that includes a UE 402, an LTE base station (LTE BS) 404, and a mmW base station (mmW BS) 406. The LTE network communication between the UE 402 and the LTE base station 404 is via an LTE UL 408 and an LTE DL 416. The mmW network communication between the UE 402 and the mmW base station 406 is via a mmW UL (not shown) and a mmW DL 412. The LTE base station 404 and the mmW base station 406 communicate via a link 410 and a link 414 of an X2 interface. Each of the above links may include a control channel and/or a data channel.

At a first operation, the UE 402 will send control information to the mmW base station 406. The UE 402 "pushes" this information to the LTE base station 404 using its allocated LTE UL 408.

At a second operation, the LTE base station 404 recognizes that the UL traffic from the UE 402 is destined for the mmW base station 406. For example, the UL traffic may include an indication that UL traffic is destined for the mmW base station 406. As another example, the UL traffic may have been sent over a channel that is designated for relaying information to the mmW base station 406. The LTE base station 404 thus forwards the UL traffic to the mmW base station 406 using the link 410 of the X2 interface.

At a third operation, the mmW base station 406 takes action based on the UE UL control information forwarded via the X2 interface.

At a fourth operation, the mmW base station 406 transmits the result of its action to the UE 402 directly or to the LTE base station 304 for forwarding to the UE 402. Thus, the mmW base station 406 may directly transmit mmW base station action information to the UE 402 on the mmW DL 412. Alternatively, or in addition, the mmW base station 406 may forward mmW base station action information to the UE 402 via the link 414 of the X2 interface and the LTE DL 416.

Figure 5:
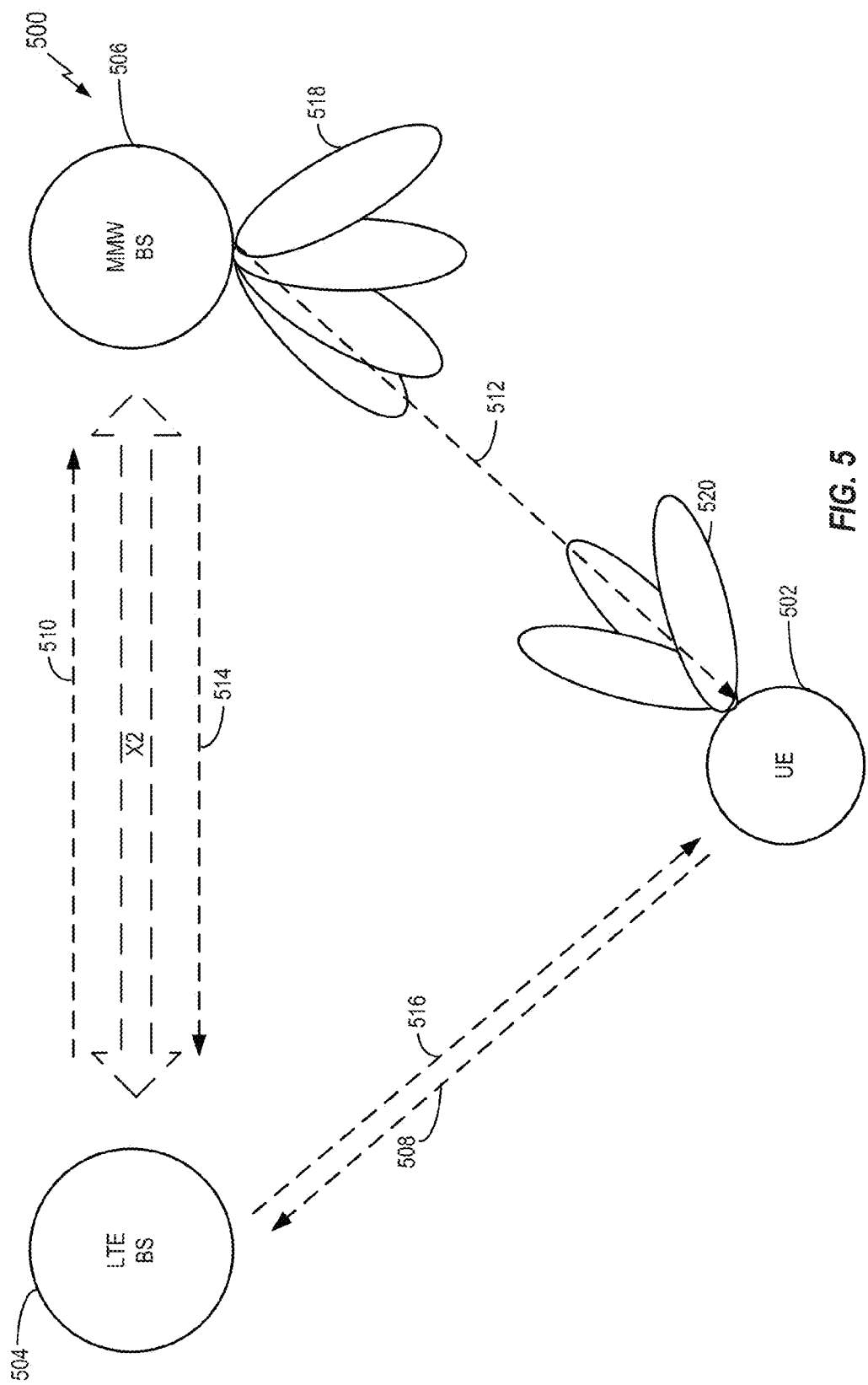
FIG. 5 illustrates an example of a communication system where an LTE base station is used to support beam search-related communication between a UE and a mmW base station in accordance with some aspects of the disclosure.

FIG. 5 illustrates an example use case involving beam search using an LTE UL channel. In FIG. 5, a portion of a communication system 500 includes a UE 502, an LTE base station (LTE BS) 504, and a mmW base station (mmW BS) 506. The LTE network communication between the UE 502 and the LTE base station 504 is via an LTE UL 508 and an LTE DL 516. The mmW network communication between the UE 502 and the mmW base station 506 is via a mmW UL (not shown) and a mmW DL 512. The LTE base station 504 and the mmW base station 506 communicate via a link 510 and a link 514 of an X2 interface. Each of the above links may include a control channel and/or a data channel.

If a beamforming configuration is not yet established between the mmW base station 506 and the UE 502, the mmW base station 506 and the UE 502 cannot communicate. Without being able to communicate, they cannot share any information about the beam search process. In accordance with the teachings herein, the LTE UL 508 and the X2 interface are used to relay beam search results (e.g., the signal-to-noise ratio (SNR) associated with each beam direction) from the UE 502 to the mmW base station 506.

At a first operation, the UE 502 and the mmW base station 506 become aware of each other's presence, but have not yet determined the optimal beamforming configuration to be used to communicate with each other. Accordingly, the UE 502 and the mmW base station 506 will perform a beam search procedure. Here, the mmW base station 506 transmits multiple beam search signals 518 (e.g., transmits different beams in different directions) and the UE 502 monitors for received beam search signals 520.

At a second operation, the UE 502 measures the quality (e.g., SNR) of each of the received beam search signals 520 and generates a measurement report. The UE 502 will then relay this measurement report to the mmW base station 506. Typically, the measurement report is time-critical information. For example, if the UE 502 is moving, the measurement report will only be valid for a certain period of time. Thus, it may be desirable for the UE 502 and the mmW base station 506 to agree upon a current beam configuration as soon as possible. To this end, the UE 502 may use its allocated LTE UL 508 to transmit the measurement report to the LTE base station 504 and request the LTE base station 504 to forward the measurement report to the mmW base station 506 with urgency. If the LTE UL was not already allocated, as a preliminary matter, the UE 502 requests UL allocation from the LTE base station 504.

Thus, at a third operation, the LTE base station 504 receives the measurement report via the LTE UL 508.

At a fourth operation, the LTE base station 504 determines that the measurement report is to be forward to the mmW base station 506 over the X2 interface.

At a fifth operation, the mmW base station 506 receives the measurement report via the link 510 of the X2 interface.

At a sixth operation, upon receiving the measurement report, the mmW base station 506 determines which beam (or beams) to use to establish a connection (UL/DL) with the UE 502. In addition, the mmW base station will transmit a response to the UE 502 so that the UE 502 will know which beams (or beams) to use for direct communication with the mmW base station 506.

At an optional seventh operation, the mmW base station 506 may send the response directly to the UE 502 via the mmW DL 512.

Alternatively, at an optional eighth operation, the mmW base station 506 may send the response to the LTE base station 504 (via the link 514) to be forwarded to the UE 502 on the LTE DL 516.

At a ninth operation, based on the response from the mmW base station 506, the UE 502 determines which beam to use (e.g., the beam corresponding to the mmW DL 512) for communicating with the mmW base station 506.

Figure 6:
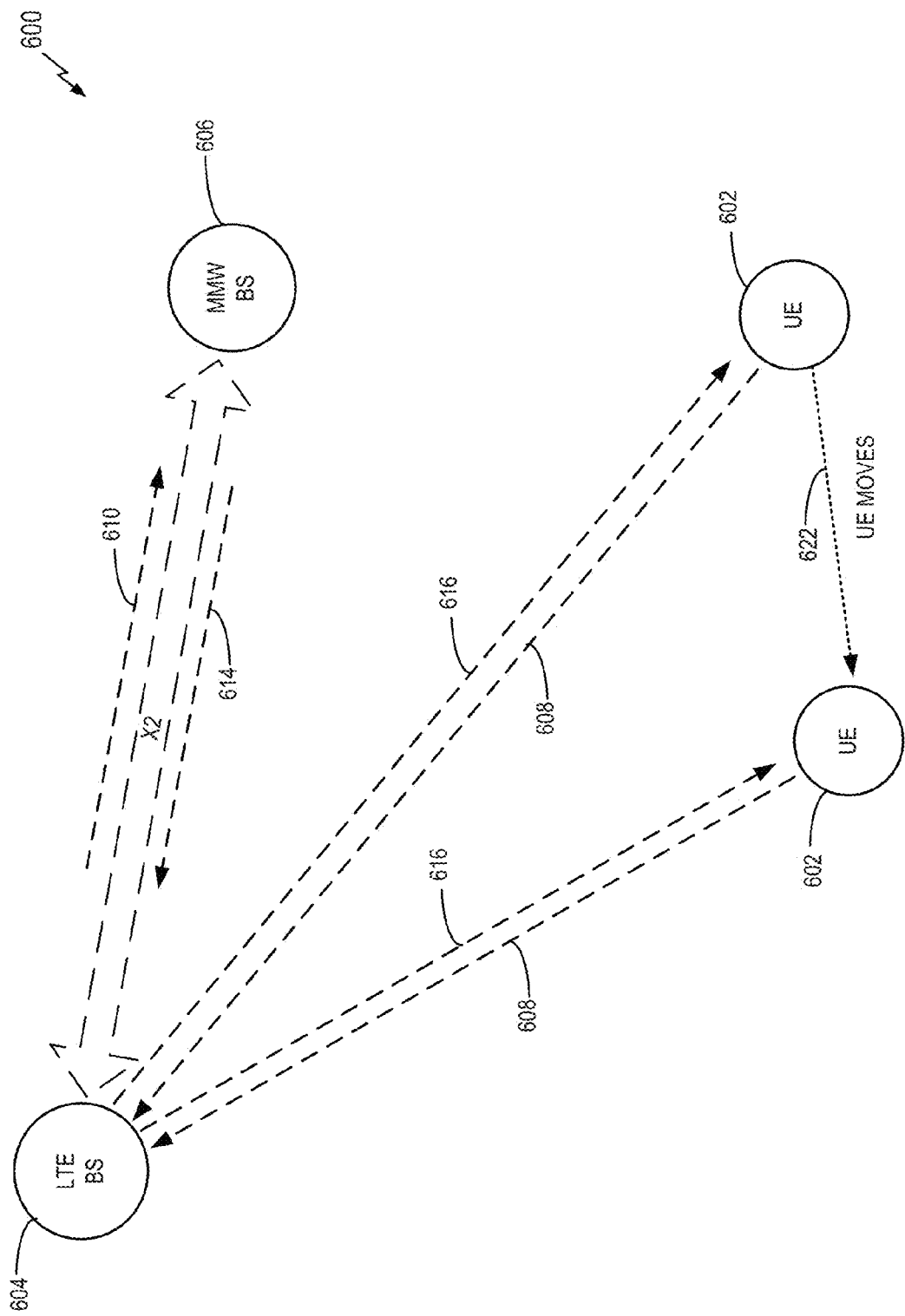
FIG. 6 illustrates an example of a communication system where an LTE base station is used to support periodic control link communication between a UE and a mmW base station in accordance with some aspects of the disclosure.

FIG. 6 illustrates an example use case involving LTE periodic link control. In FIG. 6, a portion of a communication system 600 includes a UE 602, an LTE base station (LTE BS) 604, and a mmW base station (mmW BS) 606. The LTE network communication between the UE 602 and the LTE base station 604 is via an LTE UL 608 and an LTE DL 616. The LTE base station 604 and the mmW base station 606 communicate via a link 610 and a link 614 of an X2 interface. Each of the above links may include a control channel and/or a data channel.

The UE 602 may be in a highly dynamic mmW channel environment, but has no data to transmit or receive. Thus, although it is desirable for the UE 602 and the mmW base station 606 to maintain communication (e.g., via keep-alive messages), the corresponding overhead may be relatively high. For example, a significant amount of beam tracking effort may be expended for a relatively small amount of data transmission.

The mmW channel may be subject to significant change as the UE 602 moves (indicated by the two positions of the UE 602 and the dashed line 622). Overhead to maintain beam tracking may thus be unjustifiably high given that only short keep-alive messages are being sent.

In accordance with the teachings herein, the LTE UL 608 and the X2 interface may be set up to relay periodic control messages from the UE 602 to the mmW base station 606. Typically, the LTE UL 608 requires less overhead than a mmW channel. Thus, system overhead may be reduced.

At a first operation, the UE 602 has no data to transmit (TX) or receive (RX). As discussed above, it may be desirable to send keep-alive messages without performing beam tracking operations. Accordingly, the UE 602 sets up the LTE UL 608 to send keep-alive messages to be forwarded to the mmW base station 606.

At a second operation, the LTE base station 604 sets up a relay via X2 upon receiving a request from the UE 602. The LTE base station 604 then forwards the keep-alive messages to the mmW base station 606 via the link 610 of the X2 interface.

At a third operation, the mmW base station 606 may respond to a keep alive message by sending a message to the LTE base station 612 (via the link 614 of the X2 interface) for relaying to the UE 602 (via the LTE DL 616). In addition, the mmW base station 606 may send a request to beamform to the UE 602 via the LTE base station 604 when DL data destined for the UE 602 arrives at the mmW base station 606.

Figure 7:
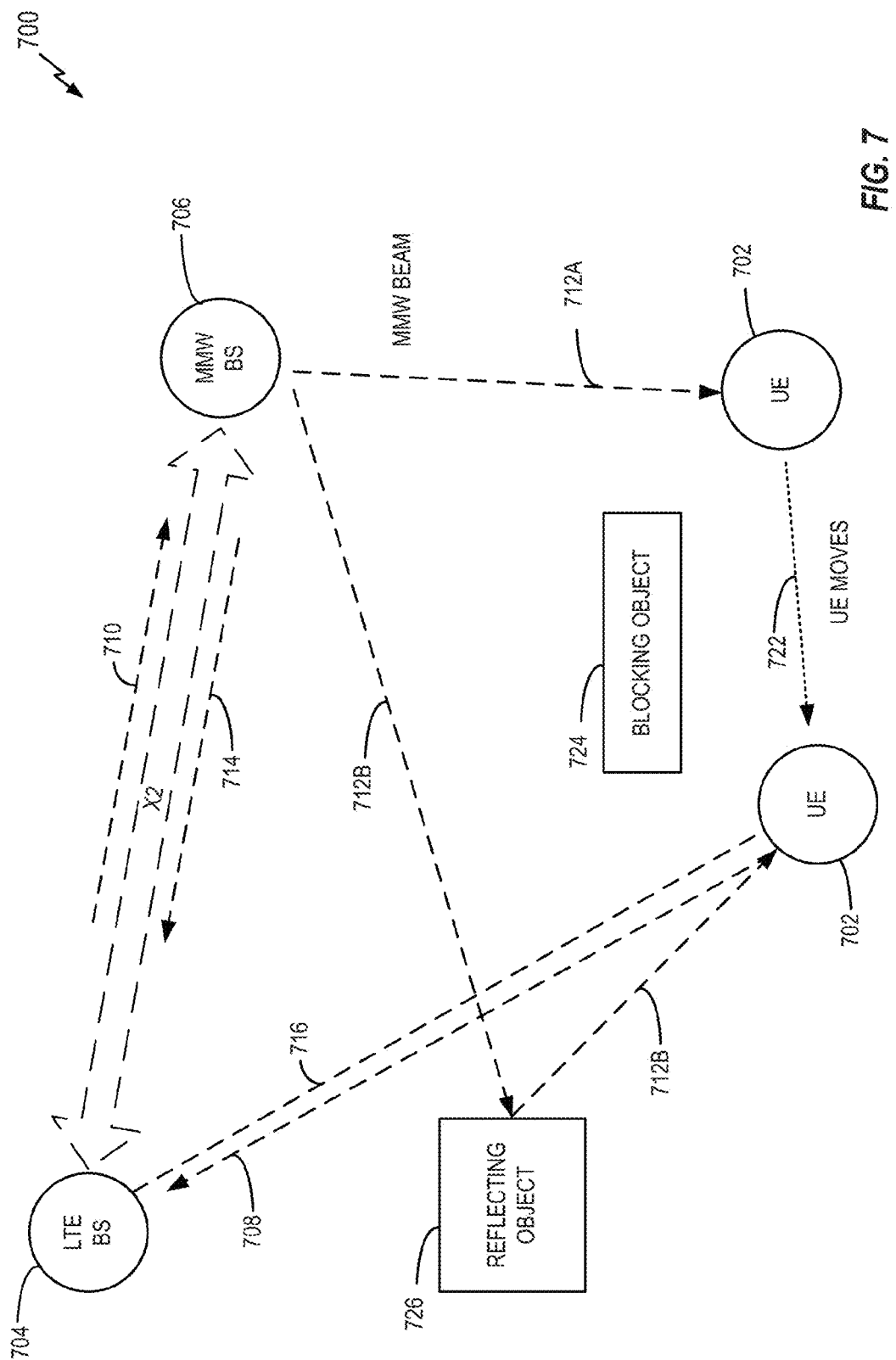
FIG. 7 illustrates an example of a communication system where an LTE base station is used to support on-demand control link communication between a UE and a mmW base station in accordance with some aspects of the disclosure.

FIG. 7 illustrates an example use case involving an on-demand LTE control link. In FIG. 7, a portion of a communication system 700 includes a UE 702, an LTE base station (LTE BS) 704, and a mmW base station (mmW BS) 706. The LTE network communication between the UE 702 and the LTE base station 704 is via an LTE UL 708 and an LTE DL 716. The mmW network communication between the UE 702 and the mmW base station 706 is via a mmW UL (not shown) and a mmW DL 712 (represented by mmW DL 712A and mmW DL 712B a discussed below). The LTE base station 704 and the mmW base station 706 communicate via a link 710 and a link 714 of an X2 interface. Each of the above links may include a control channel and/or a data channel.

The UE 702 may be in a highly dynamic mmW channel environment and be in the middle of receiving DL data on a mmW DL channel (initially, the mmW DL 712A). In this scenario, it is possible that the current beam used for the mmW DL disappears suddenly (e.g., the UE 702 moved behind a blocking object 724). In this case, the UE 702 may immediately request the LTE base station 704 to set up a control relay to the mmW base station 706 via the X2 interface so that the UE 702 can send an alert message to the mmW base station 706.

At a first operation, the UE 702 is in the middle of a mmW DL 712A, but then moves (indicated by the two positions of the UE 702 and the dashed line 722) behind the blocking object 724 that blocks the current beam (the mmW DL 712A) used for the mmW DL channel.

At a second operation, the UE 702 requests the LTE base station 704 to set up a control relay to the mmW base station 706.

At a third operation, the LTE base station 704 sets up a relay link via the X2 interface upon receiving a request from the UE 702.

The UE 702 then starts sending alert control messages via the LTE UL 708. In addition, the LTE base station 704 starts forwarding the alert control messages to the mmW base station 706 via the link 710 of the X2 interface.

At a fourth operation, the mmW base station 706 receives the alert control messages and is thereby informed of the failure of the mmW DL channel. The mmW base station 706 may then send a command to the UE 702 to change the beamforming to a secondary mmW DL 712B that uses a different beam. The mmW base station 706 sends this command to the LTE base station 704 via the link 714 of the X2 interface. The LTE base station 704 forwards the command to the UE 702 via the LTE DL 716.

The UE 702 may then use the new beamforming configuration to receive traffic from or send traffic to the mmW base station 706. As indicated in FIG. 7, in some scenarios, the signals of the secondary mmW DL 712B may reflect off of a reflecting object 726.

Figure 8:
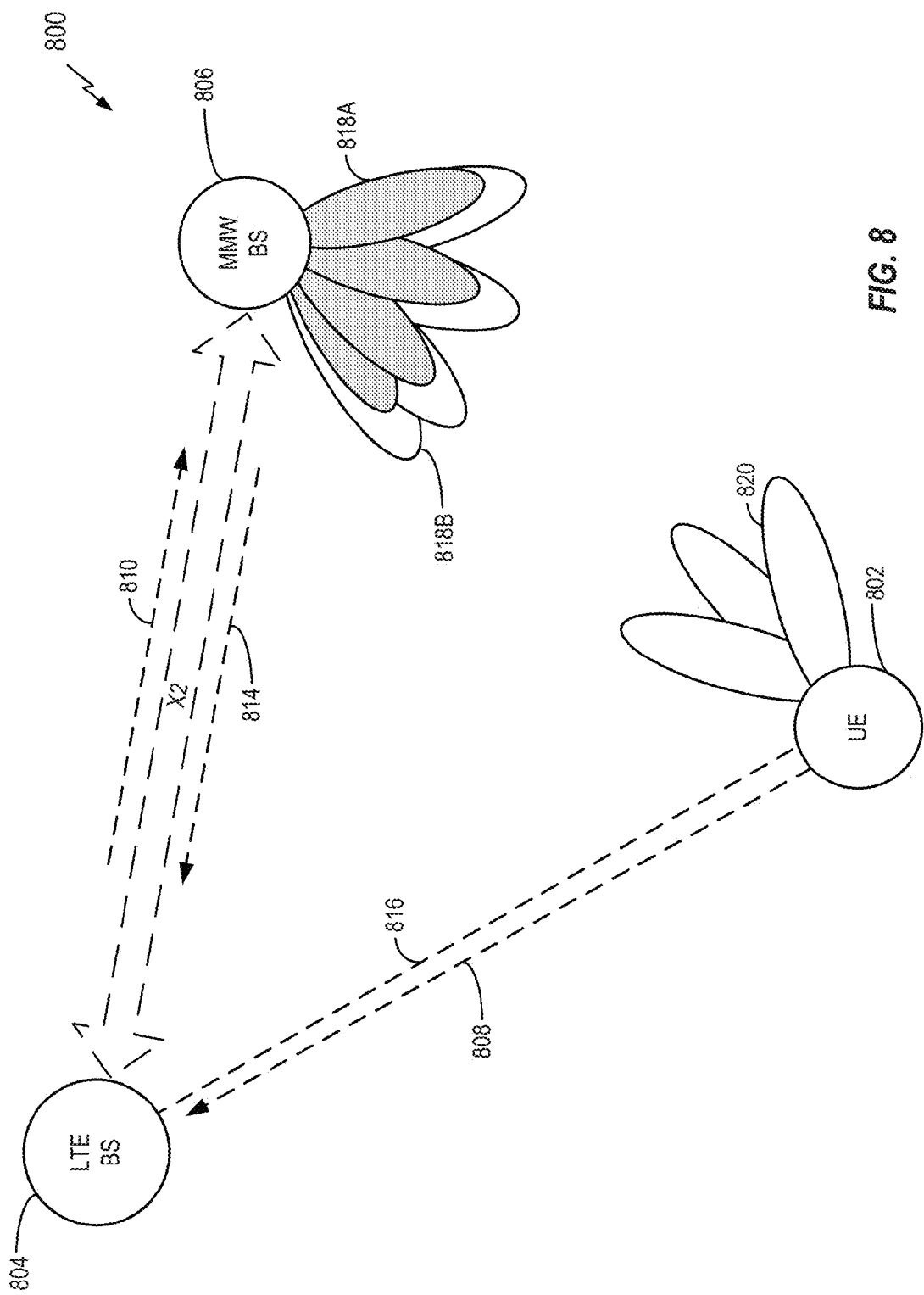
FIG. 8 illustrates an example of a communication system where an LTE base station is used to support beamforming training-related communication between a UE and a mmW base station in accordance with some aspects of the disclosure.

FIG. 8 illustrates an example use case involving a request for additional beamforming training. In FIG. 8, a portion of a communication system 800 includes a UE 802, an LTE base station (LTE BS) 804, and a mmW base station (mmW BS) 806. The LTE network communication between the UE 802 and the LTE base station 804 is via an LTE UL 808 and an LTE DL 816. The LTE base station 804 and the mmW base station 806 communicate via a link 810 and a link 814 of an X2 interface. Each of the above links may include a control channel and/or a data channel.

In some scenarios, the UE 802 might not be able to find an adequate receive beam after performing a standard beam search procedure. In this case, the UE 802 may request additional beamforming training with the mmW base station 806. In some aspects, this additional beamforming training may use different beamforming parameters (e.g., with longer code lengths, different modulations, etc.). To this end, the UE 802 may send a corresponding request to the mmW base station 806 via the LTE base station 804.

At a first operation, the UE 802 cannot find an adequate receive beam with the current beam search 820. Accordingly, the UE 802 may request that the mmW base station 806 use a longer code to increase the SNR. To this end, the UE 802 sends a request to the LTE base station 804, which will set up a control relay to the mmW base station 806 via the X2 interface.

At a second operation, the LTE base station 804 receives the request for the longer code for beam search via the LTE UL 808.

At a third operation, the LTE base station 804 forwards the request to the mmW base station 806 via the link 810 of the X2 interface.

At a fourth operation, the mmW base station 806 changes the code length to be used for the next available beam search cycle. As a result, the mmW base station 806 may transmit the beams 818B instead of the beams 818A. The mmW base station 806 will then send a notification to the UE 802 confirming this request. To this end, the mmW base station 806 sends the confirmation to the LTE base station 804 via the link 814 of the X2 interface.

At a fifth operation, the LTE base station 804 relays the confirmation to the UE 802 via the LTE DL 816. The UE 802 then adjusts its beam search settings for the next available beam search cycle.

Figure 9:
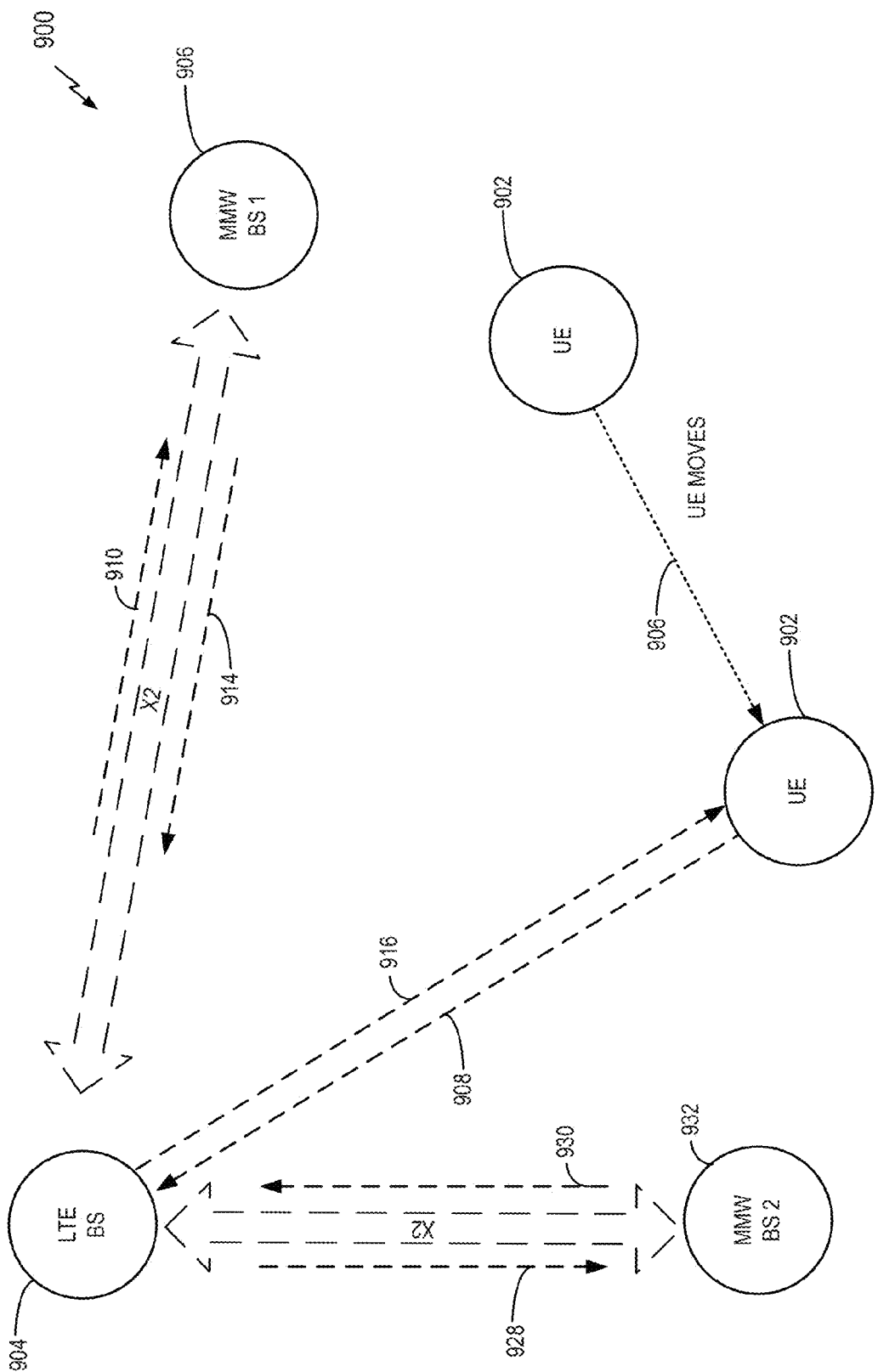
FIG. 9 illustrates an example of a communication system where an LTE base station is used to support handover-related communication between a UE and a mmW base station in accordance with some aspects of the disclosure.

FIG. 9 illustrates an example use case involving multiple mmW base stations. In FIG. 9, a portion of a communication system 900 includes a UE 902, an LTE base station (LTE BS) 904, a first mmW base station (mmW BS) 906, and a second mmW base station (mmW BS) 932. The LTE network communication between the UE 902 and the LTE base station 904 is via an LTE UL 908 and an LTE DL 916. The LTE base station 904 and the first mmW base station 906 communicate via a link 910 and a link 914 of a first X2 interface. The LTE base station 904 and the second mmW base station 932 communicate via a link 928 and a link 930 of a second X2 interface. Each of the above links may include a control channel and/or a data channel.

At some point in time, the UE 902 may find a better mmW base station to connect to other than the current mmW base station (e.g., due to the UE moving). In this case, the UE 902 may inform the better mmW base station that the UE 902 wishes to connect (hand-off) to that mmW base station. To this end, the UE 902 sends a request to the better mmW base station via the LTE base station 904. In addition, the UE 902 may use a mmW UL channel established with the current mmW base station or a relay link to the current mmW base station to prepare for hand-off.

At a first operation, the UE 902 has found a potentially better mmW base station (the second mmW base station 932). However, the UE 902 might not have RACHed (performed a random access channel access) with the first mmW base station 906. For example, the UE 902 may be in idle state. In this case, the UE 902 cannot directly request the first mmW base station 906 to tell the second mmW base station 932 to prepare for hand-off. Instead, the UE 902 sends the hand-off request to the LTE base station 904 which sets up the first X2 interface with the first mmW base station 906 and the second X2 interface with the mmW base station 932.

At a second operation, the LTE base station 904 forwards the hand-off request to the second mmW base station 932 via the link 928 of the second X2 interface.

At a third operation, the LTE base station 904 forwards a disconnect message to the first mmW base station 906 via the link 910 of the first X2 interface. The first mmW base station 906 then prepares for hand-off (e.g., involving communicating with the LTE base station 904).

At a fourth operation, the second mmW base station 932 prepares for connection with the UE 902. For example, the second mmW base station 932 may send a reply back to the UE 902 via the link 930 of the second X2 interface to the LTE base station 904. The LTE base station 904 forwards this reply to the UE 902 via the LTE DL 916. Thus, via this relayed communication, direct mmW communication may be established between the UE 902 and the second mmW base station 932.

Example Apparatus (e.g., an Access Terminal)

Figure 10:
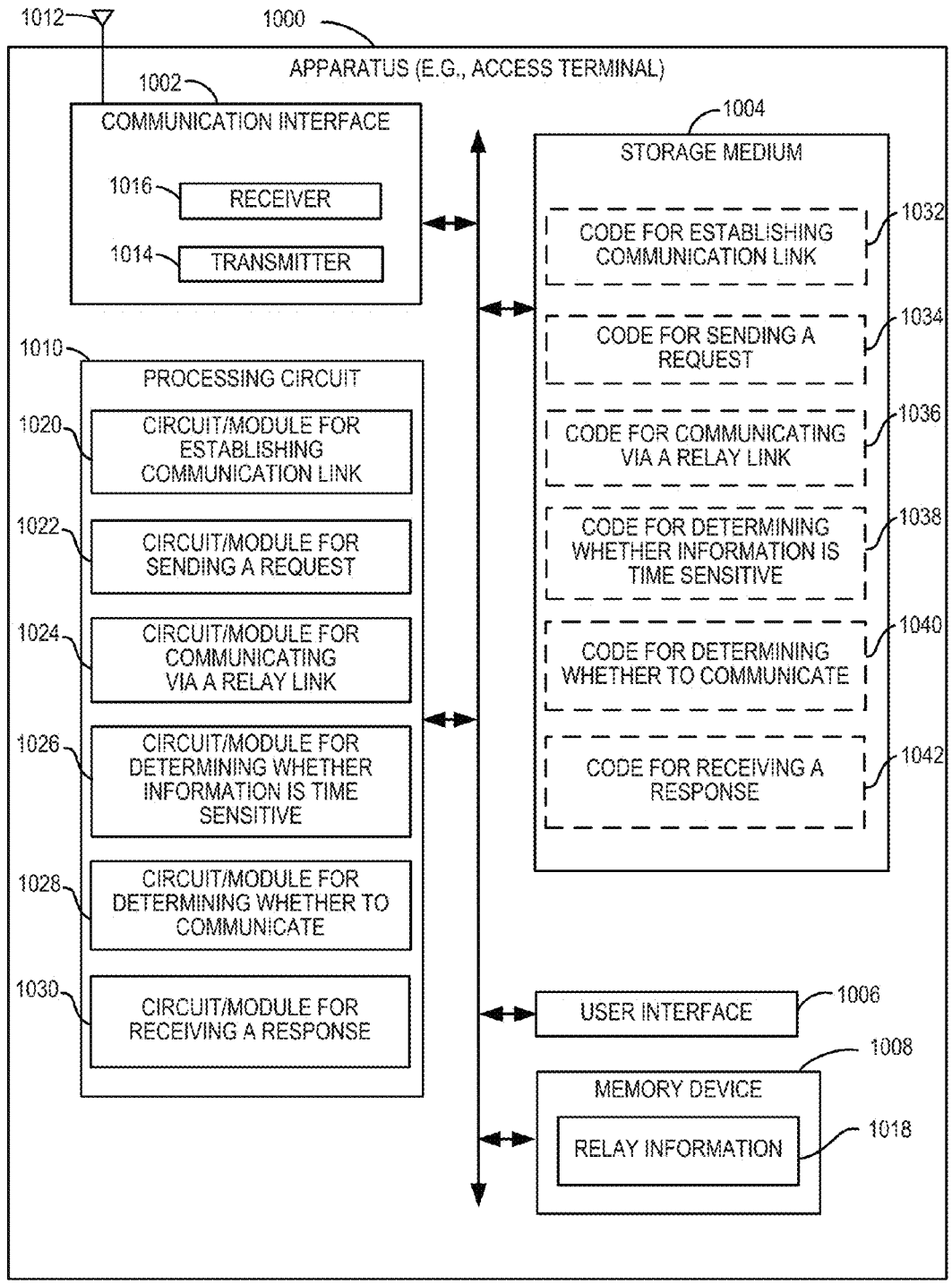
FIG. 10 illustrates a block diagram of an example hardware implementation for an apparatus (e.g., an electronic device) that executes some of the methods for supporting relay link communication in accordance with some aspects of the disclosure.

FIG. 10 illustrates a block diagram of an example hardware implementation of an apparatus 1000 (e.g., an access terminal) configured to communicate according to one or more aspects of the disclosure. For example, the apparatus 1000 could embody or be implemented within an access terminal (e.g., a UE, a mobile terminal, and so on). In various implementations, the apparatus 1000 could embody or be implemented within an access point or some other type of device. In various implementations, the apparatus 1000 could embody or be implemented within a mobile phone, a smart phone, a tablet, a portable computer, a server, a personal computer, a sensor, and or any other electronic device having circuitry.

The apparatus 1000 includes a communication interface (e.g., at least one transceiver) 1002, a storage medium 1004, a user interface 1006, a memory device (e.g., a memory circuit) 1008, and a processing circuit (e.g., at least one processor) 1010. In various implementations, the user interface 1006 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 10. The signaling bus may include any number of interconnecting buses and bridges depending on the specific application of the processing circuit 1010 and the overall design constraints. The signaling bus links together various circuits such that each of the communication interface 1002, the storage medium 1004, the user interface 1006, and the memory device 1008 are coupled to and/or in electrical communication with the processing circuit 1010. The signaling bus may also link various other circuits (not shown) such as timing sources, peripherals, voltage regulators, and power management circuits, which are well known in the art, and therefore, will not be described any further.

The communication interface 1002 provides a means for communicating with other apparatuses over a transmission medium. In some implementations, the communication interface 1002 includes circuitry and/or programming adapted to facilitate the communication of information bi-directionally with respect to one or more communication devices in a network. In some implementations, the communication interface 1002 is adapted to facilitate wireless communication of the apparatus 1000. In these implementations, the communication interface 1002 may be coupled to one or more antennas 1012 as shown in FIG. 10 for wireless communication within a wireless communication system. The communication interface 1002 can be configured with one or more standalone receivers and/or transmitters, as well as one or more transceivers. In the illustrated example, the communication interface 1002 includes a transmitter 1014 and a receiver 1016. The communication interface 1002 serves as one example of a means for receiving and/or means transmitting.

The memory device 1008 may represent one or more memory devices. As indicated, the memory device 1008 may maintain relay information 1018 along with other information used by the apparatus 1000. In some implementations, the memory device 1008 and the storage medium 1004 are implemented as a common memory component. The memory device 1008 may also be used for storing data that is manipulated by the processing circuit 1010 or some other component of the apparatus 1000.

The storage medium 1004 may represent one or more computer-readable, machine-readable, and/or processor-readable devices for storing programming, such as processor executable code or instructions (e.g., software, firmware), electronic data, databases, or other digital information. The storage medium 1004 may also be used for storing data that is manipulated by the processing circuit 1010 when executing programming. The storage medium 1004 may be any available media that can be accessed by a general purpose or special purpose processor, including portable or fixed storage devices, optical storage devices, and various other mediums capable of storing, containing or carrying programming.

By way of example and not limitation, the storage medium 1004 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1004 may be embodied in an article of manufacture (e.g., a computer program product). By way of example, a computer program product may include a computer-readable medium in packaging materials. In view of the above, in some implementations, the storage medium 1004 may be a non-transitory (e.g., tangible) storage medium.

The storage medium 1004 may be coupled to the processing circuit 1010 such that the processing circuit 1010 can read information from, and write information to, the storage medium 1004. That is, the storage medium 1004 can be coupled to the processing circuit 1010 so that the storage medium 1004 is at least accessible by the processing circuit 1010, including examples where at least one storage medium is integral to the processing circuit 1010 and/or examples where at least one storage medium is separate from the processing circuit 1010 (e.g., resident in the apparatus 1000, external to the apparatus 1000, distributed across multiple entities, etc.).

Programming stored by the storage medium 1004, when executed by the processing circuit 1010, causes the processing circuit 1010 to perform one or more of the various functions and/or process operations described herein. For example, the storage medium 1004 may include operations configured for regulating operations at one or more hardware blocks of the processing circuit 1010, as well as to utilize the communication interface 1002 for wireless communication utilizing their respective communication protocols.

The processing circuit 1010 is generally adapted for processing, including the execution of such programming stored on the storage medium 1004. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1010 is arranged to obtain, process and/or send data, control data access and storage, issue commands, and control other desired operations. The processing circuit 1010 may include circuitry configured to implement desired programming provided by appropriate media in at least one example. For example, the processing circuit 1010 may be implemented as one or more processors, one or more controllers, and/or other structure configured to execute executable programming. Examples of the processing circuit 1010 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1010 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1010 are for illustration and other suitable configurations within the scope of the disclosure are also contemplated.

According to one or more aspects of the disclosure, the processing circuit 1010 may be adapted to perform any or all of the features, processes, functions, operations and/or routines for any or all of the apparatuses described herein. For example, the processing circuit 1010 may be configured to perform any of the steps, functions, and/or processes described with respect to FIGS. 1-9 and 11-14. As used herein, the term "adapted" in relation to the processing circuit 1010 may refer to the processing circuit 1010 being one or more of configured, employed, implemented, and/or programmed to perform a particular process, function, operation and/or routine according to various features described herein.

The processing circuit 1010 may be a specialized processor, such as an application specific integrated circuit (ASIC) that serves as a means for (e.g., structure for) carrying out any one of the operations described in conjunction with FIGS. 1-9 and 11-14. The processing circuit 1010 serves as one example of a means for transmitting and/or a means for receiving.

According to at least one example of the apparatus 1000, the processing circuit 1010 may include one or more of a circuit/module for establishing a communication link 1020, a circuit/module for sending a request 1022, a circuit/module for communicating via a relay link 1024, a circuit/module for determining whether information is time sensitive 1026, a circuit/module for determining whether to communicate 1028, or a circuit/module for receiving a response 1030.

The circuit/module for establishing a communication link 1020 may include circuitry and/or programming (e.g., code for establishing a communication link 1032 stored on the storage medium 1004) adapted to perform several functions relating to, for example, establishing a communication link between an access terminal and a first base station that includes circuitry for a first RAT. In some implementations, the circuit/module for establishing a communication link 1020 communicates with a base station (e.g., an LTE eNB) to establish a connection with a network (e.g., an LTE network). For example, a message may be sent to the base station (e.g., on a random access channel or some other channel) to initiate establishment of a communication link with the base station. A response to this request may then be received from the base station indicating whether the link can be established. In conjunction with this communication, one or more parameters for the link may be negotiated.

The circuit/module for sending a request 1022 may include circuitry and/or programming (e.g., code for sending a request 1034 stored on the storage medium 1004) adapted to perform several functions relating to, for example, sending a request to a first base station to establish a relay link through the first base station between an access terminal and a second base station that includes circuitry for a second RAT different from the first RAT. Initially, the module for sending a request 1022 obtains request data to be sent. For example, the module for sending a request 1022 may obtain this data directly from a component of the apparatus (e.g., the memory device 1008 or some other component). In some implementations, the module for sending a request 1022 processes (e.g., encodes) the data to be transmitted. The module for sending a request 1022 then causes the data to be sent. For example, the module for sending a request 1022 can pass the data to the transmitter 1014. In some implementations, the transmitter 1014 includes the circuit/module for sending a request 1022 and/or the code for sending a request 1034.

The circuit/module for communicating via a relay link 1024 may include circuitry and/or programming (e.g., code for communicating via a relay link 1036 stored on the storage medium 1004) adapted to perform several functions relating to, for example, communicating with a second base station via a relay link through a first base station. In some aspects, the communicating involves receiving information from a component of the apparatus 1000 (e.g., the receiver 1016 or the memory device 1008). In some aspects, the communicating involves sending information directly to an ultimate destination (e.g., if the circuit/module for communicating via a relay link 1024 includes a transmitter) or sending the information to another component of the apparatus 1000 (e.g., the transmitter 1014) for transmission to another device. In some implementations, the communication interface 1002 includes the circuit/module for communicating via a relay link 1024 and/or the code for communicating via a relay link 1036.

The circuit/module for determining whether information is time sensitive 1026 may include circuitry and/or programming (e.g., code for determining whether information is time sensitive 1038 stored on the storage medium 1004) adapted to perform several functions relating to, for example, determining whether information to be communicated is time sensitive. Initially, the circuit/module for determining whether information is time sensitive 1026 receives an indication of the type of information or receives the information itself. The circuit/module for determining whether information is time sensitive 1026 then determines, based on the type of information, whether the information is time sensitive. For example, beamforming measurement report information may be more time sensitive than best effort traffic. The circuit/module for determining whether information is time sensitive 1026 then sends an indication of the determination (e.g., yes or no) to a component of the apparatus 1000 (e.g., the memory device 1008 or some other component).

The circuit/module for determining whether to communicate 1028 may include circuitry and/or programming (e.g., code for determining whether to communicate 1040 stored on the storage medium 1004) adapted to perform several functions relating to, for example, determining whether to communicate with a second base station via the relay link as a result of a determination of whether information to be communicated is time sensitive. Initially, the circuit/module for determining whether to communicate 1028 receives an indication of the determination by the circuit/module for determining whether information is time sensitive 1026. The circuit/module for determining whether to communicate 1028 then determines, based on the indication, whether to communicate the information via the relay link or some other link (e.g., a direct mmW link). For example, the relay link may be selected for time-sensitive data or when the mmW link is not established or is not stable. The circuit/module for determining whether to communicate 1028 then sends an indication of the determination (e.g., which link to use to communicate) to a component of the apparatus 1000 (e.g., the memory device 1008 or some other component).

The circuit/module for receiving a response 1030 may include circuitry and/or programming (e.g., code for receiving a response 1042 stored on the storage medium 1004) adapted to perform several functions relating to, for example, receiving samples during a symbol period. Initially, the circuit/module for receiving a response 1030 obtains received information. For example, the circuit/module for receiving a response 1030 may obtain this information directly from a component of the apparatus (e.g., the receiver 1016, the memory device 1008, or some other component) or from a device (e.g., an access terminal) that transmitted the information. In some implementations, the circuit/module for receiving a response 1030 identifies a memory location of a value in the memory device 1008 and invokes a read of that location. In some implementations, the circuit/module for receiving a response 1030 processes (e.g., decodes) the received information. The circuit/module for receiving a response 1030 then outputs the received information (e.g., stores the information in the memory device 1008 or sends the information to another component of the apparatus 1000). In some implementations, the receiver 1016 includes the circuit/module for receiving a response 1030 and/or the code for receiving a response 1042.

As mentioned above, programming stored by the storage medium 1004, when executed by the processing circuit 1010, causes the processing circuit 1010 to perform one or more of the various functions and/or process operations described herein. For example, the programming, when executed by the processing circuit 1010, may cause the processing circuit 1010 to perform the various functions, steps, and/or processes described herein with respect to FIGS. 1-9 and 11-14 in various implementations. As shown in FIG. 10, the storage medium 1004 may include one or more of the code for establishing a communication link 1032, the code for sending a request 1034, the code for communicating via a relay link 1036, the code for determining whether information is time sensitive 1038, the code for determining whether to communicate 1040, or the code for receiving a response 1042.

Example Processes

Figure 11:
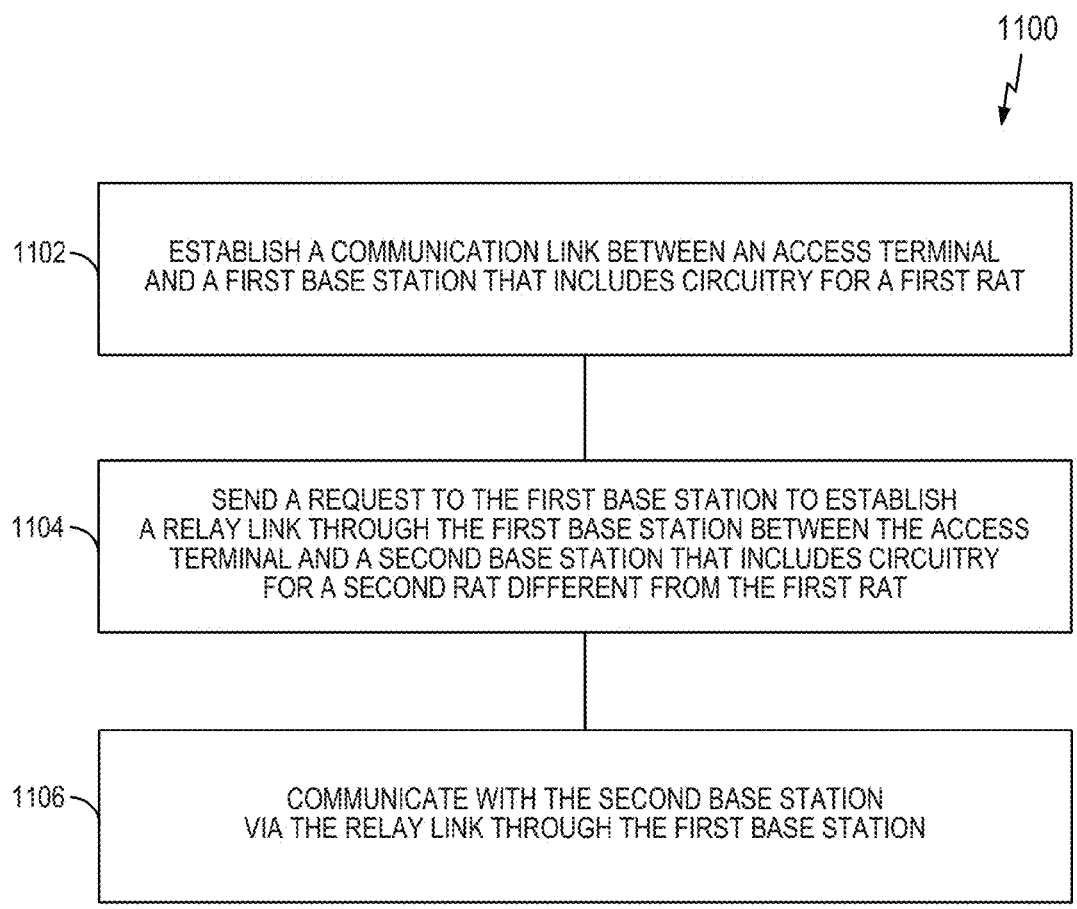
FIG. 11 illustrates an example of a process for relay link communication in accordance with some aspects of the disclosure.

FIG. 11 illustrates a process 1100 for communication in accordance with some aspects of the disclosure. The process 1100 may take place within a processing circuit (e.g., the processing circuit 1010 of FIG. 10), which may be located in a base station, a mobile device, or some other suitable apparatus. Of course, in various aspects within the scope of the disclosure, the process 1100 may be implemented by any suitable apparatus capable of supporting communication-related operations.

At block 1102, an apparatus (e.g., an access terminal) establishes a communication link between an access terminal and a first base station that includes circuitry for a first radio access technology (RAT). In some aspects, the first RAT includes long term evolution (LTE) technology. For example, a UE may cooperate with an LTE base station to establish an LTE link between the UE and the base station.

At block 1104, the apparatus sends a request to the first base station to establish a relay link through the first base station. This relay link is between the access terminal and a second base station that includes circuitry for a second RAT different from the first RAT. In some aspects, the relay link is established via an X2 interface between the first base station and the second base station. For example, a relay link may be established between the UE and a mmW base station via an LTE base station.

At block 1106, the apparatus conducts communication with the second base station via the relay link through the first base station. The first RAT may have higher reliability than the second RAT. In addition, the second RAT may have higher throughput than the first RAT. In some aspects, the second RAT includes millimeter wave (mmW) technology.

In some aspects, the communicating includes transmitting information and/or receiving information. In some aspects, the communicating includes communicating beamforming information. In some aspects, the beamforming information includes antenna amplitude information and/or antenna phase information. In some aspects, the communicating includes communicating at least one of: control information, beam search results, a scheduling request, a request to switch beamforming direction, periodic control link information, on-demand control link information, beamforming training information, or handover information. In some aspects, the communicating with a second base station includes communicating information via a data channel established on the communication link with the first base station. In some aspects, the communicating with a second base station includes communicating information via a control channel established on the communication link with the first base station.

Figure 12:
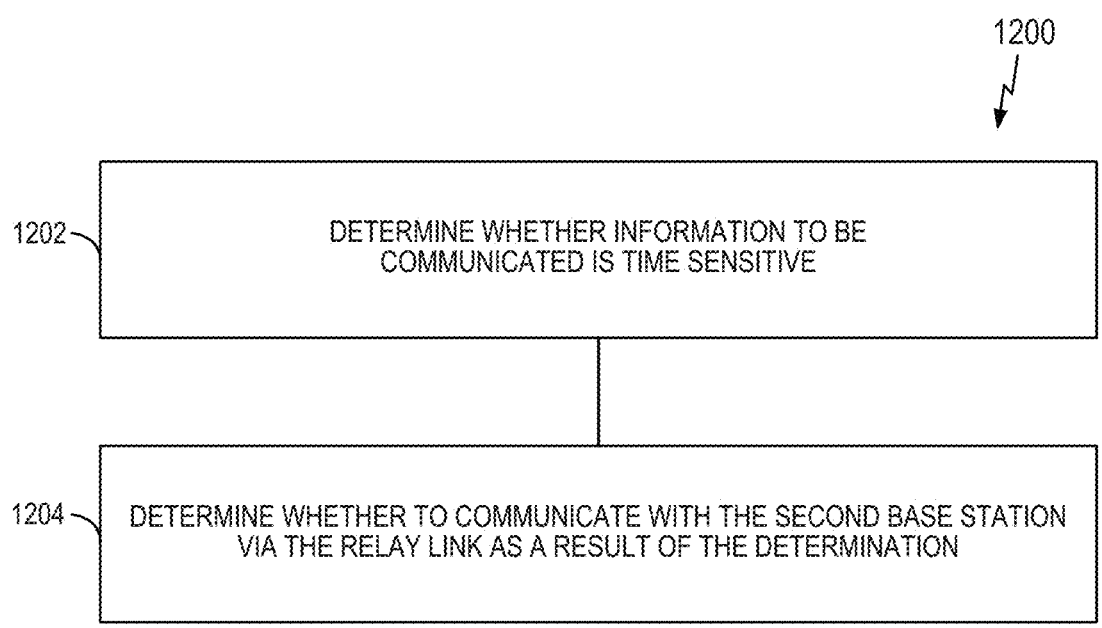
FIG. 12 illustrates an example of a process for selective relay link communication in accordance with some aspects of the disclosure.

FIG. 12 illustrates a process 1200 for communication in accordance with some aspects of the disclosure. The process 1200 may be employed in conjunction with the process 1100 of FIG. 11. The process 1200 may take place within a processing circuit (e.g., the processing circuit 1010 of FIG. 10), which may be located in a base station, a mobile device, or some other suitable apparatus. Of course, in various aspects within the scope of the disclosure, the process 1200 may be implemented by any suitable apparatus capable of supporting communication-related operations.

At block 1202, an apparatus (e.g., an access terminal) determines whether information to be communicated is time sensitive. For example, a UE may determine whether the information is delay sensitive control information, beamforming parameter information, measurement results, etc.

At block 1204, the apparatus determines whether to communicate with the second base station via the relay link. This determination is made as a result of the determination of block 1202. For example, a UE may elect to use the relay link to send delay sensitive control information to a mmW base station instead of using a mmW uplink channel.

Figure 13:
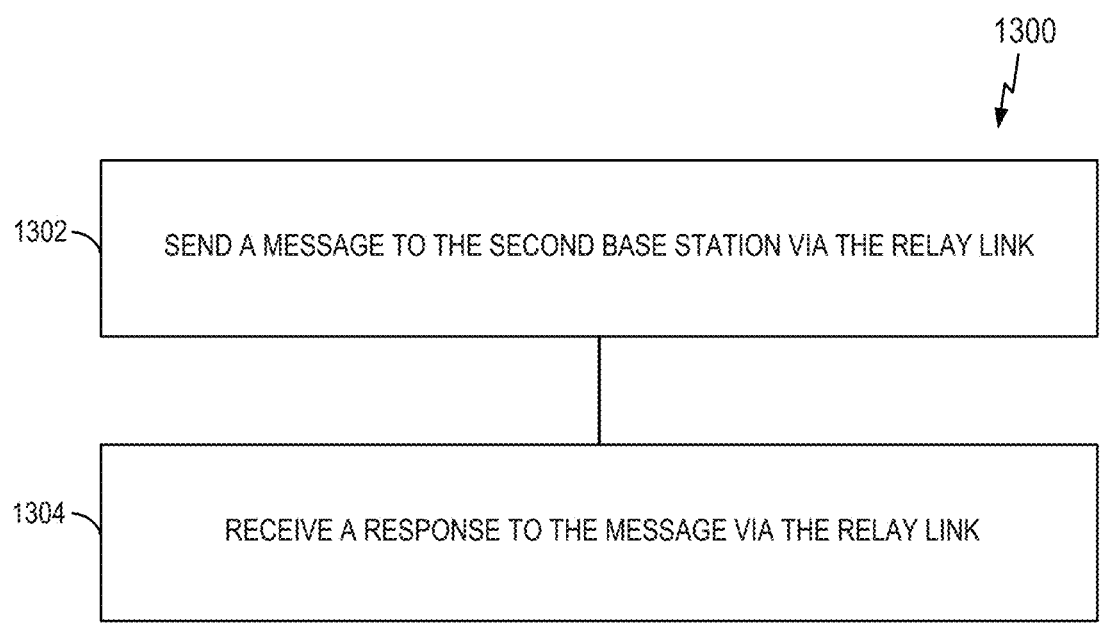
FIG. 13 illustrates an example of a process for message and response relay link communication in accordance with some aspects of the disclosure.

FIG. 13 illustrates a process 1300 for communication in accordance with some aspects of the disclosure. The process 1300 may be employed in conjunction with the process 1100 of FIG. 11. The process 1300 may take place within a processing circuit (e.g., the processing circuit 1010 of FIG. 10), which may be located in a base station, a mobile device, or some other suitable apparatus. Of course, in various aspects within the scope of the disclosure, the process 1300 may be implemented by any suitable apparatus capable of supporting communication-related operations.

At block 1302, an apparatus (e.g., an access terminal) sends a message to the second base station via the relay link.

At block 1304, the apparatus receives a response to the message via the relay link. Thus, in this case, the message and the response may be communicated via the same channel.

Figure 14:
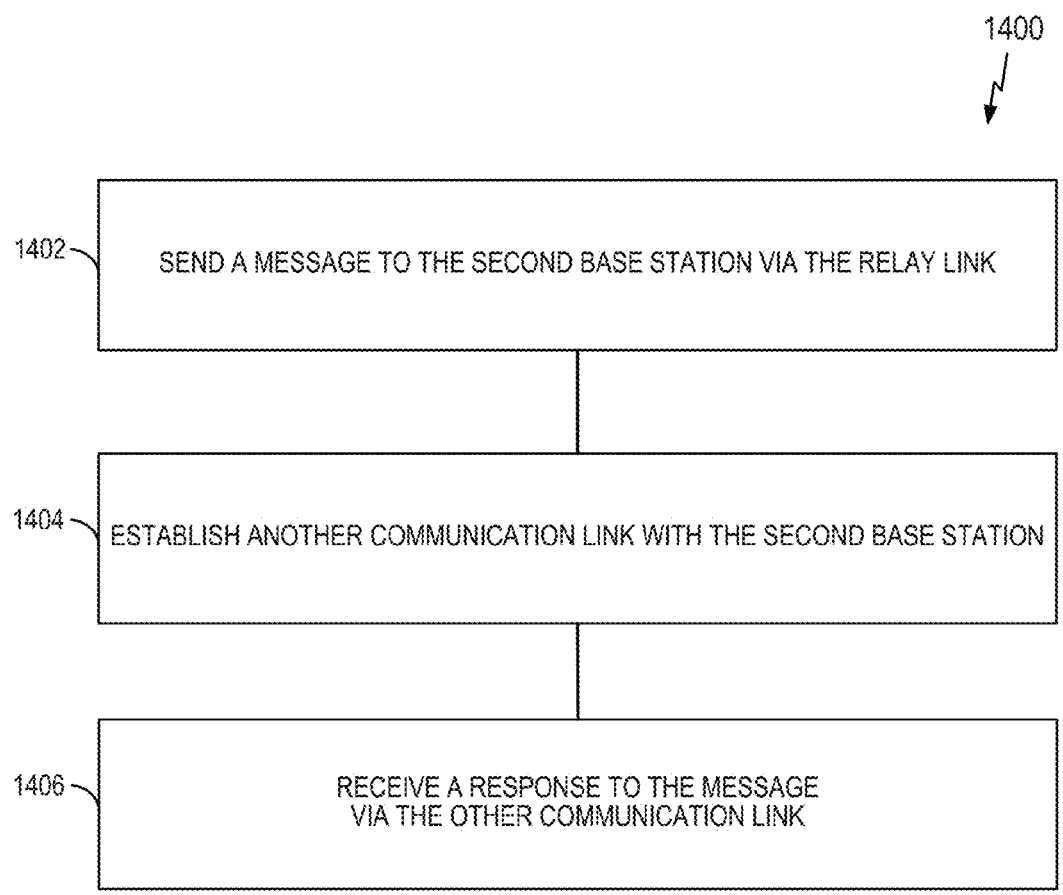
FIG. 14 illustrates an example of a process for message and response communication in accordance with some aspects of the disclosure.

In contrast, FIG. 14 illustrates a different process 1400 for communication in accordance with some aspects of the disclosure. The process 1400 also may be employed in conjunction with the process 1100 of FIG. 11. The process 1400 may take place within a processing circuit (e.g., the processing circuit 1010 of FIG. 10), which may be located in a base station, a mobile device, or some other suitable apparatus. Of course, in various aspects within the scope of the disclosure, the process 1400 may be implemented by any suitable apparatus capable of supporting communication-related operations.

At block 1402, an apparatus (e.g., an access terminal) sends a message to the second base station via the relay link. Thus, this operation corresponds in some aspects to the operation of block 1302 of FIG. 13.

However, at block 1404, another communication link is established with the second base station. For example, a UE may establish direct mmW link with a mmW base station.

At block 1406, the apparatus receives a response to the message via the other communication link. Thus, in this case, the message and the response are communicated via different channels.

Example Apparatus (e.g., a Base Station)

Figure 15:
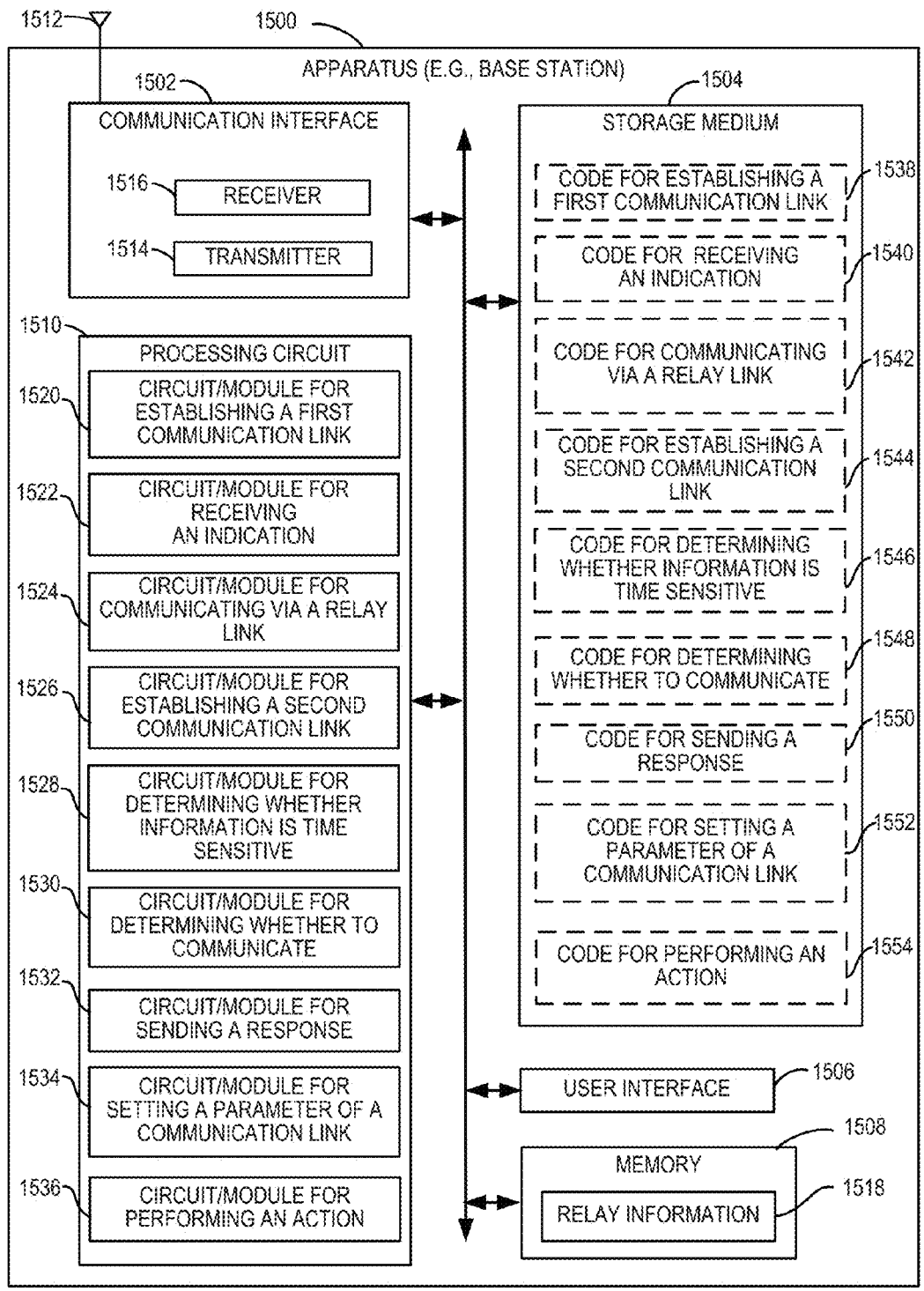
FIG. 15 illustrates a block diagram of another example hardware implementation for an apparatus (e.g., an electronic device) that executes some of the methods for supporting relay link communication in accordance with some aspects of the disclosure.

FIG. 15 illustrates a block diagram of an example hardware implementation of an apparatus 1500 configured to communicate according to one or more aspects of the disclosure. For example, the apparatus 1500 could embody or be implemented within a mmW base station or some other type of base station. In various implementations, the apparatus 1500 could embody or be implemented within an access terminal, an access point, or some other type of device. In various implementations, the apparatus 1500 could embody or be implemented within a mobile phone, a smart phone, a tablet, a portable computer, a server, a personal computer, a sensor, and or any other electronic device having circuitry.

The apparatus 1500 includes a communication interface (e.g., at least one transceiver) 1502, a storage medium 1504, a user interface 1506, a memory device (e.g., a memory circuit) 1508, and a processing circuit (e.g., at least one processor) 1510. In various implementations, the user interface 1506 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 15. The signaling bus may include any number of interconnecting buses and bridges depending on the specific application of the processing circuit 1510 and the overall design constraints. The signaling bus links together various circuits such that each of the communication interface 1502, the storage medium 1504, the user interface 1506, and the memory device 1508 are coupled to and/or in electrical communication with the processing circuit 1510. The signaling bus may also link various other circuits (not shown) such as timing sources, peripherals, voltage regulators, and power management circuits, which are well known in the art, and therefore, will not be described any further.

The communication interface 1502 provides a means for communicating with other apparatuses over a transmission medium. In some implementations, the communication interface 1502 includes circuitry and/or programming adapted to facilitate the communication of information bi-directionally with respect to one or more communication devices in a network. In some implementations, the communication interface 1502 is adapted to facilitate wireless communication of the apparatus 1500. In these implementations, the communication interface 1502 may be coupled to one or more antennas 1512 as shown in FIG. 15 for wireless communication within a wireless communication system. The communication interface 1502 can be configured with one or more standalone receivers and/or transmitters, as well as one or more transceivers. In the illustrated example, the communication interface 1502 includes a transmitter 1514 and a receiver 1516. The communication interface 1502 serves as one example of a means for receiving and/or means transmitting.

The memory device 1508 may represent one or more memory devices. As indicated, the memory device 1508 may maintain relay information 1518 along with other information used by the apparatus 1500. In some implementations, the memory device 1508 and the storage medium 1504 are implemented as a common memory component. The memory device 1508 may also be used for storing data that is manipulated by the processing circuit 1510 or some other component of the apparatus 1500.

The storage medium 1504 may represent one or more computer-readable, machine-readable, and/or processor-readable devices for storing programming, such as processor executable code or instructions (e.g., software, firmware), electronic data, databases, or other digital information. The storage medium 1504 may also be used for storing data that is manipulated by the processing circuit 1510 when executing programming. The storage medium 1504 may be any available media that can be accessed by a general purpose or special purpose processor, including portable or fixed storage devices, optical storage devices, and various other mediums capable of storing, containing or carrying programming.

By way of example and not limitation, the storage medium 1504 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1504 may be embodied in an article of manufacture (e.g., a computer program product). By way of example, a computer program product may include a computer-readable medium in packaging materials. In view of the above, in some implementations, the storage medium 1504 may be a non-transitory (e.g., tangible) storage medium.

The storage medium 1504 may be coupled to the processing circuit 1510 such that the processing circuit 1510 can read information from, and write information to, the storage medium 1504. That is, the storage medium 1504 can be coupled to the processing circuit 1510 so that the storage medium 1504 is at least accessible by the processing circuit 1510, including examples where at least one storage medium is integral to the processing circuit 1510 and/or examples where at least one storage medium is separate from the processing circuit 1510 (e.g., resident in the apparatus 1500, external to the apparatus 1500, distributed across multiple entities, etc.).

Programming stored by the storage medium 1504, when executed by the processing circuit 1510, causes the processing circuit 1510 to perform one or more of the various functions and/or process operations described herein. For example, the storage medium 1504 may include operations configured for regulating operations at one or more hardware blocks of the processing circuit 1510, as well as to utilize the communication interface 1502 for wireless communication utilizing their respective communication protocols.

The processing circuit 1510 is generally adapted for processing, including the execution of such programming stored on the storage medium 1504. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1510 is arranged to obtain, process and/or send data, control data access and storage, issue commands, and control other desired operations. The processing circuit 1510 may include circuitry configured to implement desired programming provided by appropriate media in at least one example. For example, the processing circuit 1510 may be implemented as one or more processors, one or more controllers, and/or other structure configured to execute executable programming. Examples of the processing circuit 1510 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1510 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1510 are for illustration and other suitable configurations within the scope of the disclosure are also contemplated.

According to one or more aspects of the disclosure, the processing circuit 1510 may be adapted to perform any or all of the features, processes, functions, operations and/or routines for any or all of the apparatuses described herein. For example, the processing circuit 1510 may be configured to perform any of the steps, functions, and/or processes described with respect to FIGS. 1-9 and 16-21. As used herein, the term "adapted" in relation to the processing circuit 1510 may refer to the processing circuit 1510 being one or more of configured, employed, implemented, and/or programmed to perform a particular process, function, operation and/or routine according to various features described herein.

The processing circuit 1510 may be a specialized processor, such as an application specific integrated circuit (ASIC) that serves as a means for (e.g., structure for) carrying out any one of the operations described in conjunction with FIGS. 1-9 and 16-21. The processing circuit 1510 serves as one example of a means for transmitting and/or a means for receiving.

According to at least one example of the apparatus 1500, the processing circuit 1510 may include one or more of a circuit/module for establishing a first communication link 1520, a circuit/module for receiving an indication 1522, a circuit/module for communicating via a relay link 1524, a circuit/module for establishing a second communication link 1526, a circuit/module for determining whether information is time sensitive 1528, a circuit/module for determining whether to communicate 1530, a circuit/module for sending a response 1532, a circuit/module for setting a parameter of a communication link 1534, or a circuit/module for performing an action 1536.

The circuit/module for establishing a first communication link 1520 may include circuitry and/or programming (e.g., code for establishing a first communication link 1538 stored on the storage medium 1504) adapted to perform several functions relating to, for example, establishing a first communication link between a first base station that includes circuitry for a first radio access technology (RAT) based on millimeter wave (mmW) signaling and a second base station that includes circuitry for a second radio access technology (RAT) different from the first RAT. In some implementations, the circuit/module for establishing a first communication link 1520 communicates with a base station (e.g., an LTE eNB) to establish a connection with a network (e.g., an LTE network). For example, the circuit/module for establishing a first communication link 1520 may negotiate with the base station to set up an X2 interface or another type of interface. In some implementations, a message (e.g., a request) is sent to the base station (e.g., on a backhaul channel or some other channel) to initiate establishment of a communication link with the base station. A response to this request may then be received from the base station indicating whether the link can be established. In conjunction with this communication, one or more parameters for the link may be negotiated.

The circuit/module for receiving an indication 1522 may include circuitry and/or programming (e.g., code for receiving an indication 1540 stored on the storage medium 1504) adapted to perform several functions relating to, for example, receiving an indication that a relay link between the first base station and an access terminal is established via the first communication link. Initially, the circuit/module for receiving an indication 1522 obtains received information. For example, the circuit/module for receiving an indication 1522 may obtain this information from a component of the apparatus (e.g., the receiver 1016, the memory device 1008, or some other component) or directly from a device (e.g., a base station) that transmitted the information. In some implementations, the circuit/module for receiving an indication 1522 identifies a memory location of a value in the memory device 1008 and invokes a read of that location. In some implementations, the circuit/module for receiving an indication 1522 processes (e.g., decodes) the received information. The circuit/module for receiving an indication 1522 then outputs the received information (e.g., stores the indication in the memory device 1008 or sends the indication to another component of the apparatus 1000). In some implementations, the receiver 1016 includes the circuit/module for receiving an indication 1522 and/or the code for receiving an indication 1540.

The circuit/module for communicating via a relay link 1524 may include circuitry and/or programming (e.g., code for communicating via a relay link 1542 stored on the storage medium 1504) adapted to perform several functions relating to, for example, communicating with the access terminal via the relay link. In some implementations, the communicating involves receiving information from a component of the apparatus 1500 (e.g., the receiver 1516 or the memory device 1508). In some implementations, the communicating involves sending information directly to an ultimate destination (e.g., if the circuit/module for communicating via a relay link 1524 includes a transmitter) or sending the information to another component of the apparatus 1500 (e.g., the transmitter 1514) for transmission to another device. In some implementations, the communication interface 1502 includes the circuit/module for communicating via a relay link 1524 and/or the code for communicating via a relay link 1542.

The circuit/module for establishing a second communication link 1526 may include circuitry and/or programming (e.g., code for establishing a second communication link 1544 stored on the storage medium 1504) adapted to perform several functions relating to, for example, establishing a second communication link with the access terminal via the first RAT. In some implementations, the circuit/module for establishing a second communication link 1526 communicates with an access terminal (e.g., a UE) to establish beamformed communication with the access terminal. In some implementations, negotiations for establishing the second communication link are sent via a relay link. In some implementations, a message is received from the access terminal (e.g., on a discovery channel or some other channel) to initiate establishment of a communication link with the access terminal. A response to this request may then be sent indicating whether the link can be established. In conjunction with this communication, one or more parameters for the link may be negotiated.

The circuit/module for determining whether information is time sensitive 1528 may include circuitry and/or programming (e.g., code for determining whether information is time sensitive 1546 stored on the storage medium 1504) adapted to perform several functions relating to, for example, determining whether information to be communicated is time sensitive. Initially, the circuit/module for determining whether information is time sensitive 1528 receives an indication of the type of information or receives the information itself. The circuit/module for determining whether information is time sensitive 1528 then determines, based on the type of information, whether the information is time sensitive. For example, beamforming configuration information may be time sensitive. The circuit/module for determining whether information is time sensitive 1528 then sends an indication of the determination (e.g., yes or no) to a component of the apparatus 1500 (e.g., the memory device 1508 or some other component).

The circuit/module for determining whether to communicate 1530 may include circuitry and/or programming (e.g., code for determining whether to communicate 1548 stored on the storage medium 1504) adapted to perform several functions relating to, for example, determining whether to communicate with the access terminal via the relay link as a result of a determination of whether information to be communicated is time sensitive. Initially, the circuit/module for determining whether to communicate 1530 receives an indication of the determination by the circuit/module for determining whether information is time sensitive 1528. The circuit/module for determining whether to communicate 1530 then determines, based on the indication, whether to communicate the information via the relay link or some other link (e.g., a direct mmW link). For example, the relay link may be selected for time-sensitive data or when the mmW link is not established or is not stable. The circuit/module for determining whether to communicate 1530 then sends an indication of the determination (e.g., which link to use to communicate) to a component of the apparatus 1500 (e.g., the memory device 1508 or some other component).

The circuit/module for sending a response 1532 may include circuitry and/or programming (e.g., code for sending a response 1550 stored on the storage medium 1504) adapted to perform several functions relating to, for example, sending a response to a message received from the access terminal via the relay link. This response may be sent via the second communication link. Initially, the circuit/module for sending a response 1532 receives the message (e.g., via the receiver 1516). The circuit/module for sending a response 1532 then determines an appropriate response based on the message. For example, a mmW base station may receive a request from an access terminal for the current beamforming configuration. The circuit/module for sending a response 1532 then sends the response to a component of the apparatus 1500 (e.g., the transmitter 1514 or some other component). In some implementations, the communication interface 1502 includes the circuit/module for sending a response 1532 and/or the code for sending a response 1550.

The circuit/module for setting a parameter of a communication link 1534 may include circuitry and/or programming (e.g., code for setting a parameter of a communication link 1552 stored on the storage medium 1504) adapted to perform several functions relating to, for example, setting a parameter of the second communication link based on information received as a result of communication via the relay link. Initially, the circuit/module for setting a parameter of a communication link 1534 receives the information (e.g., via the receiver 1516). The circuit/module for setting a parameter of a communication link 1534 then determines, based on the information, a parameter for the communication link. For example, a mmW base station may receive a request from an access terminal to change a beamforming parameter. The circuit/module for setting a parameter of a communication link 1534 then sends the parameter to a component of the apparatus 1500 (e.g., the communication interface 1502 or some other component) so that the communication link will operate in a desired manner.

The circuit/module for performing an action 1536 may include circuitry and/or programming (e.g., code for performing an action 1554 stored on the storage medium 1504) adapted to perform several functions relating to, for example, performing an action relating to the second communication link based on information received as a result of communication via the relay link. Initially, the circuit/module for performing an action 1536 receives the information (e.g., via the receiver 1516). The circuit/module for performing an action 1536 then determines an appropriate action to be taken based on the received information. For example, a mmW base station may receive a request from an access terminal to handover to another mmW base station. The circuit/module for performing an action 1536 then performs the appropriate action (e.g., sends handover information to another mmW base station) and, optionally, outputs an indication of a result of the action.

As mentioned above, programming stored by the storage medium 1504, when executed by the processing circuit 1510, causes the processing circuit 1510 to perform one or more of the various functions and/or process operations described herein. For example, the programming, when executed by the processing circuit 1510, may cause the processing circuit 1510 to perform the various functions, steps, and/or processes described herein with respect to FIGS. 1-9 and 16-21 in various implementations. As shown in FIG. 15, the storage medium 1504 may include one or more of the code for establishing a first communication link 1538, the code for receiving an indication 1540, the code for communicating via a relay link 1542, the code for establishing a second communication link 1544, the code for determining whether information is time sensitive 1546, the code for determining whether to communicate 1548, the code for sending a response 1550, the code for setting a parameter of a communication link 1552, or the code for performing an action 1554.

Example Processes

Figure 16:
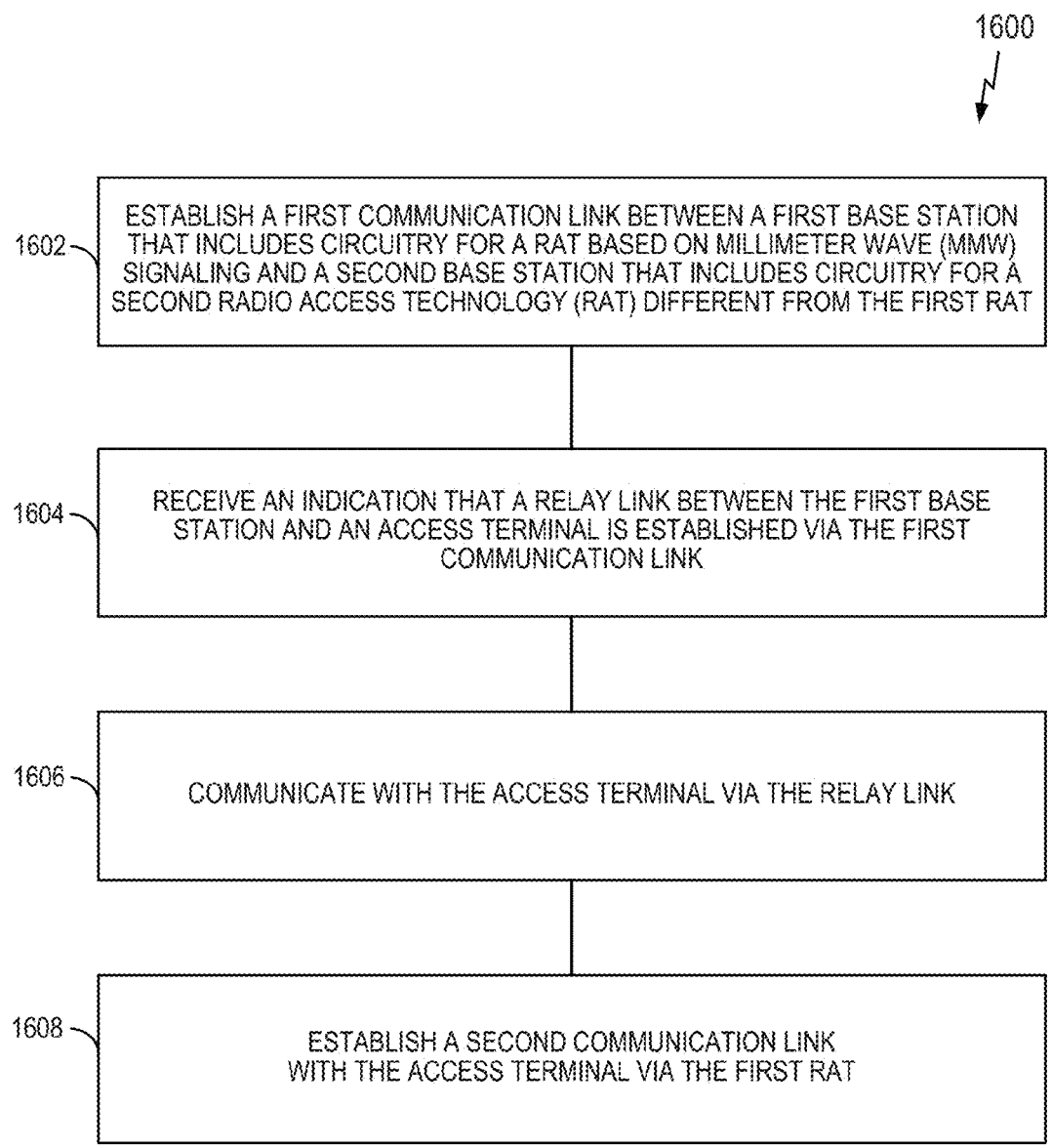
FIG. 16 illustrates an example of a process for relay link communication in accordance with some aspects of the disclosure.

FIG. 16 illustrates a process 1600 for communication in accordance with some aspects of the disclosure. The process 1600 may take place within a processing circuit (e.g., the processing circuit 1510 of FIG. 15), which may be located in a base station, a mobile device, or some other suitable apparatus. Of course, in various aspects within the scope of the disclosure, the process 1600 may be implemented by any suitable apparatus capable of supporting communication-related operations.

At block 1602, an apparatus (e.g., a base station) establishes a first communication link between a first base station that includes circuitry for a first radio access technology (RAT) based on millimeter wave (mmW) signaling and a second base station that includes circuitry for a second radio access technology (RAT) different from the first RAT. In some aspects, the second RAT includes long term evolution (LTE) technology. In some aspects, the first communication link includes an X2 interface. For example, in some implementations, the operations of block 1602 involve a mmW base station setting up an X2 interface with an LTE base station.

At block 1604, the apparatus receives an indication (e.g., from the second base station). The indication indicates that a relay link between the first base station and an access terminal is established via the first communication link. For example, a mmW base station may receive an indication that an LTE base station has set up a relay link (via an X2 interface) between a UE and the mmW base station.

At block 1604, the apparatus communicates with the access terminal via the relay link. In some aspects, the communicating includes transmitting information and/or receiving information. In some aspects, the communicating includes communicating beamforming information. In some aspects, the beamforming information includes antenna amplitude information and/or antenna phase information. In some aspects, the communicating includes communicating at least one of: control information, beam search results, a scheduling request, a request to switch beamforming direction, periodic control link information, on-demand control link information, beamforming training information, or handover information.

At block 1608, the apparatus establishes a second communication link with the access terminal via the first radio access technology (RAT). The second RAT may have higher reliability than the first RAT. In addition, the first RAT may have higher throughput than the second RAT. In some aspects, the first RAT includes millimeter wave (mmW) technology.

Figure 17:
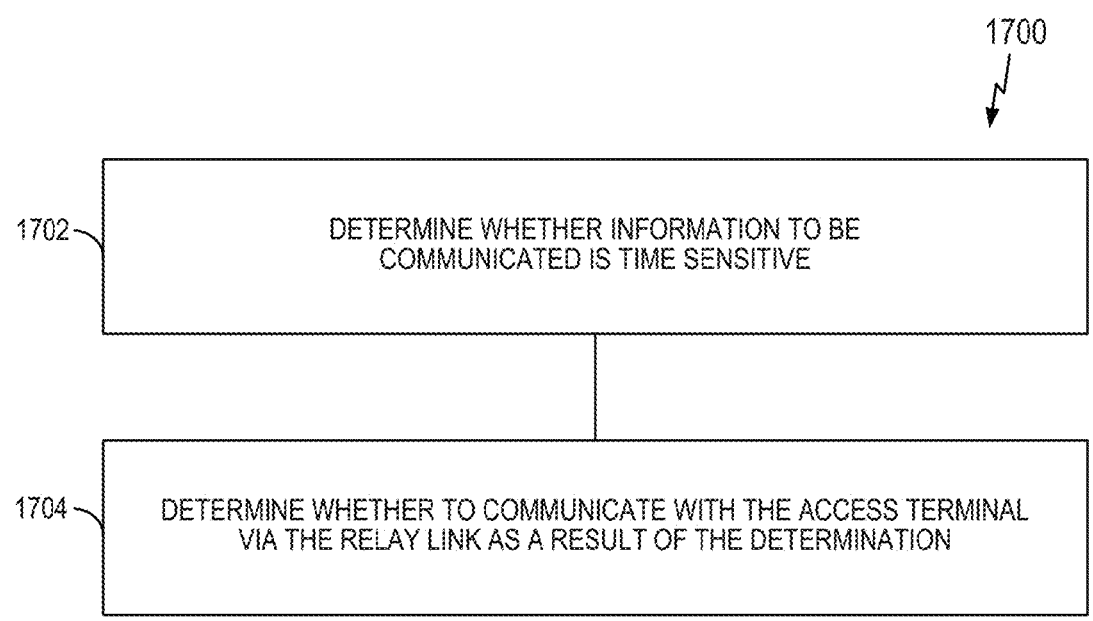
FIG. 17 illustrates an example of a process for selective relay link communication in accordance with some aspects of the disclosure.

FIG. 17 illustrates a process 1700 for communication in accordance with some aspects of the disclosure. The process 1700 may be employed in conjunction with the process 1600 of FIG. 16. The process 1700 may take place within a processing circuit (e.g., the processing circuit 1510 of FIG. 15), which may be located in a base station, a mobile device, or some other suitable apparatus. Of course, in various aspects within the scope of the disclosure, the process 1700 may be implemented by any suitable apparatus capable of supporting communication-related operations.

At block 1702, an apparatus (e.g., a base station) determines whether information to be communicated is time sensitive. For example, a mmW base station may determine whether the information is delay sensitive control information, beamforming parameter information, measurement results, etc.

At block 1704, the apparatus determines whether to communicate with the access terminal via the relay link. This determination is made as a result of the determination of block 1702. For example, a mmW base station may elect to use the relay link instead of a mmW uplink channel to send delay sensitive control information to a UE.

Figure 18:
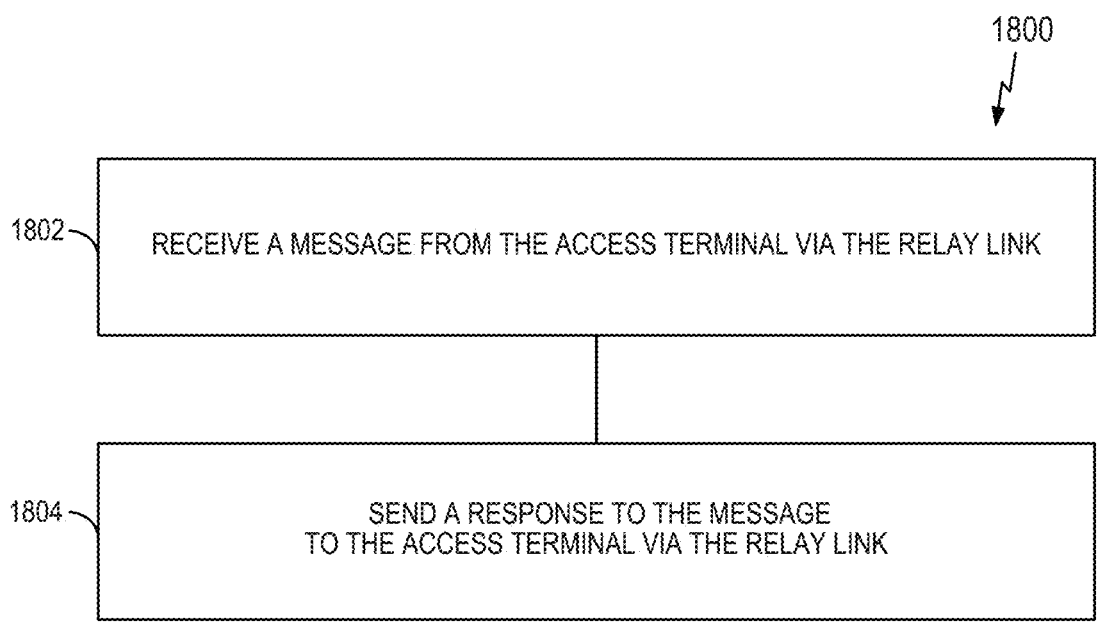
FIG. 18 illustrates an example of a process for message and response relay link communication in accordance with some aspects of the disclosure.

FIG. 18 illustrates a process 1800 for communication in accordance with some aspects of the disclosure. The process 1800 may be employed in conjunction with the process 1600 of FIG. 16. The process 1800 may take place within a processing circuit (e.g., the processing circuit 1510 of FIG. 15), which may be located in a base station, a mobile device, or some other suitable apparatus. Of course, in various aspects within the scope of the disclosure, the process 1800 may be implemented by any suitable apparatus capable of supporting communication-related operations.

At block 1802, an apparatus (e.g., a base station) receives a message from the access terminal via the relay link.

At block 1804, the apparatus sends a response to the message to the access terminal via the relay link.

Figure 19:
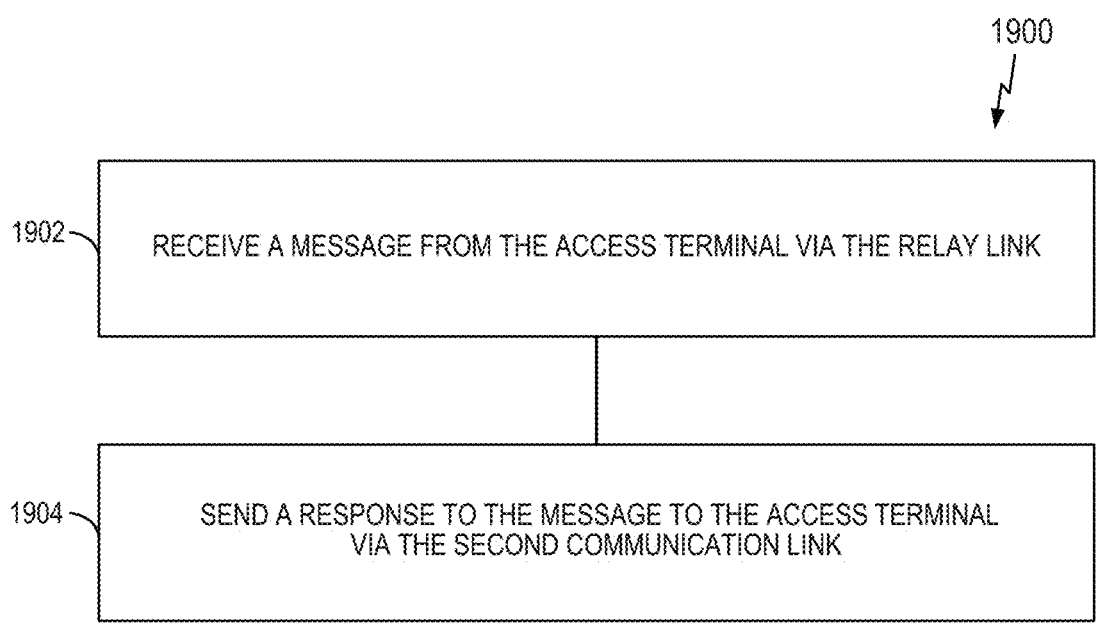
FIG. 19 illustrates an example of a process for message and response communication in accordance with some aspects of the disclosure.

FIG. 19 illustrates a process 1900 for communication in accordance with some aspects of the disclosure. The process 1900 may be employed in conjunction with the process 1600 of FIG. 16. The process 1900 may take place within a processing circuit (e.g., the processing circuit 1510 of FIG. 15), which may be located in a base station, a mobile device, or some other suitable apparatus. Of course, in various aspects within the scope of the disclosure, the process 1900 may be implemented by any suitable apparatus capable of supporting communication-related operations.

At block 1902, an apparatus (e.g., a base station) receives a message from the access terminal via the relay link.

At block 1904, the apparatus sends a response to the message to the access terminal via the second communication link.

Figure 20:
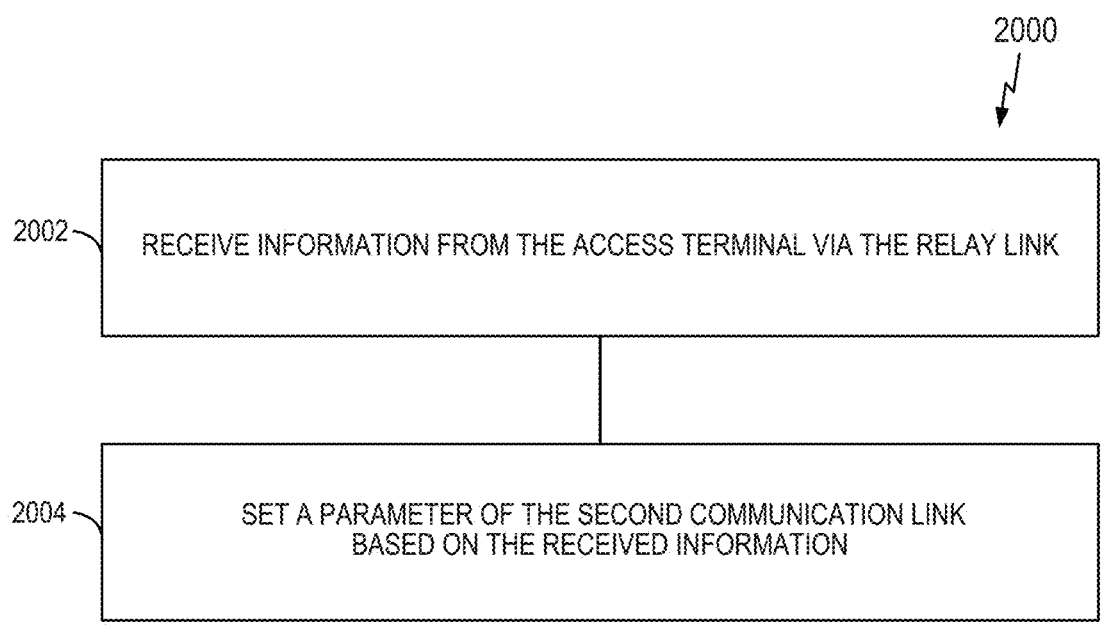
FIG. 20 illustrates an example of a process for setting a link parameter in accordance with some aspects of the disclosure.

FIG. 20 illustrates a process 2000 for communication in accordance with some aspects of the disclosure. The process 2000 may be employed in conjunction with the process 1600 of FIG. 16. The process 2000 may take place within a processing circuit (e.g., the processing circuit 1510 of FIG. 15), which may be located in a base station, a mobile device, or some other suitable apparatus. Of course, in various aspects within the scope of the disclosure, the process 2000 may be implemented by any suitable apparatus capable of supporting communication-related operations.

At block 2002, an apparatus (e.g., a base station) receives information from the access terminal via the relay link.

At block 2004, the apparatus sets a parameter of the second communication link based on the received information. For example, a mmW base station may adapt a beamforming parameter in response to a request from a UE.

Figure 21:
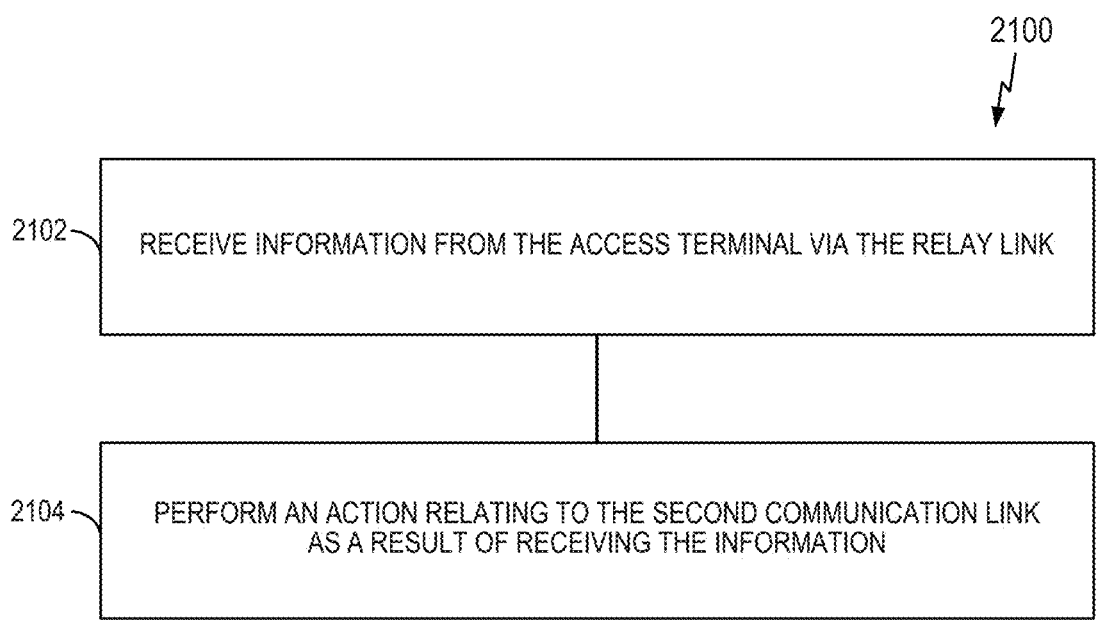
FIG. 21 illustrates an example of a process for performing an action based on received information in accordance with some aspects of the disclosure.

FIG. 21 illustrates a process 2100 for communication in accordance with some aspects of the disclosure. The process 2100 may be employed in conjunction with the process 1600 of FIG. 16. The process 2100 may take place within a processing circuit (e.g., the processing circuit 1510 of FIG. 15), which may be located in a base station, a mobile device, or some other suitable apparatus. Of course, in various aspects within the scope of the disclosure, the process 2100 may be implemented by any suitable apparatus capable of supporting communication-related operations.

At block 2102, an apparatus (e.g., a base station) receives information from the access terminal via the relay link.

At block 2104, the apparatus performs an action relating to the second communication link as a result of receiving the information at block 2102. For example, a mmW base station may initiate a handover operation in response to a handover message from a UE.

Example Apparatus (e.g., a Base Station)

Figure 22:
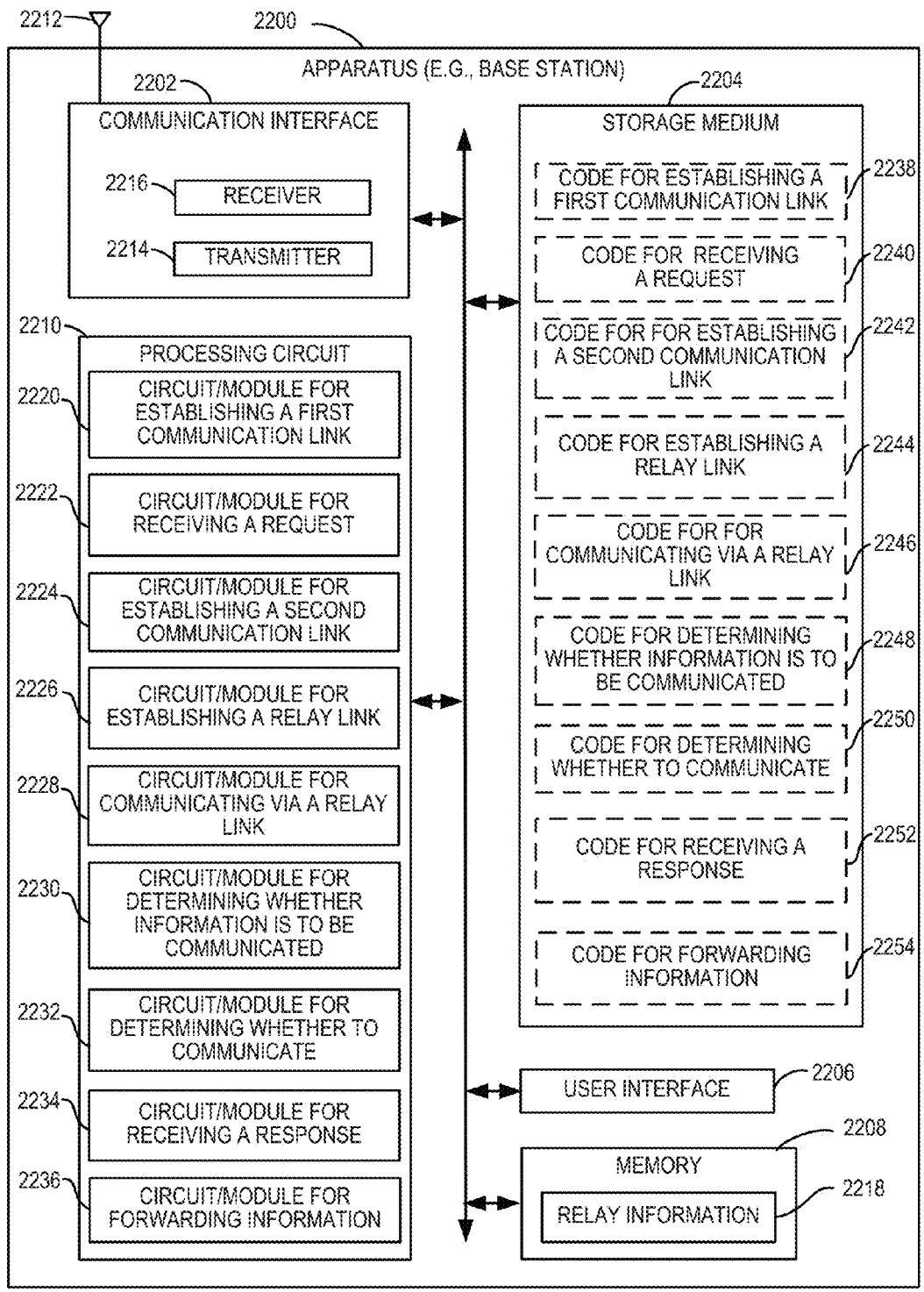
FIG. 22 illustrates a block diagram of another example hardware implementation for an apparatus (e.g., an electronic device) that executes some of the methods for supporting relay link communication in accordance with some aspects of the disclosure.

FIG. 22 illustrates a block diagram of an example hardware implementation of an apparatus 2200 configured to communicate according to one or more aspects of the disclosure. For example, the apparatus 2200 could embody or be implemented within an LTE base station, a 3G base station, a 4G base station, a 5G base station, or some other type of base station. In various implementations, the apparatus 2200 could embody or be implemented within an access terminal, an access point, or some other type of device. In various implementations, the apparatus 2200 could embody or be implemented within a mobile phone, a smart phone, a tablet, a portable computer, a server, a personal computer, a sensor, and or any other electronic device having circuitry.

The apparatus 2200 includes a communication interface (e.g., at least one transceiver) 2202, a storage medium 2204, a user interface 2206, a memory device (e.g., a memory circuit) 2208, and a processing circuit (e.g., at least one processor) 2210. In various implementations, the user interface 2206 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 22. The signaling bus may include any number of interconnecting buses and bridges depending on the specific application of the processing circuit 2210 and the overall design constraints. The signaling bus links together various circuits such that each of the communication interface 2202, the storage medium 2204, the user interface 2206, and the memory device 2208 are coupled to and/or in electrical communication with the processing circuit 2210. The signaling bus may also link various other circuits (not shown) such as timing sources, peripherals, voltage regulators, and power management circuits, which are well known in the art, and therefore, will not be described any further.

The communication interface 2202 provides a means for communicating with other apparatuses over a transmission medium. In some implementations, the communication interface 2202 includes circuitry and/or programming adapted to facilitate the communication of information bi-directionally with respect to one or more communication devices in a network. In some implementations, the communication interface 2202 is adapted to facilitate wireless communication of the apparatus 2200. In these implementations, the communication interface 2202 may be coupled to one or more antennas 2212 as shown in FIG. 22 for wireless communication within a wireless communication system. The communication interface 2202 can be configured with one or more standalone receivers and/or transmitters, as well as one or more transceivers. In the illustrated example, the communication interface 2202 includes a transmitter 2214 and a receiver 2216. The communication interface 2202 serves as one example of a means for receiving and/or means transmitting.

The memory device 2208 may represent one or more memory devices. As indicated, the memory device 2208 may maintain relay information 2218 along with other information used by the apparatus 2200. In some implementations, the memory device 2208 and the storage medium 2204 are implemented as a common memory component. The memory device 2208 may also be used for storing data that is manipulated by the processing circuit 2210 or some other component of the apparatus 2200.

The storage medium 2204 may represent one or more computer-readable, machine-readable, and/or processor-readable devices for storing programming, such as processor executable code or instructions (e.g., software, firmware), electronic data, databases, or other digital information. The storage medium 2204 may also be used for storing data that is manipulated by the processing circuit 2210 when executing programming. The storage medium 2204 may be any available media that can be accessed by a general purpose or special purpose processor, including portable or fixed storage devices, optical storage devices, and various other mediums capable of storing, containing or carrying programming.

By way of example and not limitation, the storage medium 2204 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 2204 may be embodied in an article of manufacture (e.g., a computer program product). By way of example, a computer program product may include a computer-readable medium in packaging materials. In view of the above, in some implementations, the storage medium 2204 may be a non-transitory (e.g., tangible) storage medium.

The storage medium 2204 may be coupled to the processing circuit 2210 such that the processing circuit 2210 can read information from, and write information to, the storage medium 2204. That is, the storage medium 2204 can be coupled to the processing circuit 2210 so that the storage medium 2204 is at least accessible by the processing circuit 2210, including examples where at least one storage medium is integral to the processing circuit 2210 and/or examples where at least one storage medium is separate from the processing circuit 2210 (e.g., resident in the apparatus 2200, external to the apparatus 2200, distributed across multiple entities, etc.).

Programming stored by the storage medium 2204, when executed by the processing circuit 2210, causes the processing circuit 2210 to perform one or more of the various functions and/or process operations described herein. For example, the storage medium 2204 may include operations configured for regulating operations at one or more hardware blocks of the processing circuit 2210, as well as to utilize the communication interface 2202 for wireless communication utilizing their respective communication protocols.

The processing circuit 2210 is generally adapted for processing, including the execution of such programming stored on the storage medium 2204. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 2210 is arranged to obtain, process and/or send data, control data access and storage, issue commands, and control other desired operations. The processing circuit 2210 may include circuitry configured to implement desired programming provided by appropriate media in at least one example. For example, the processing circuit 2210 may be implemented as one or more processors, one or more controllers, and/or other structure configured to execute executable programming. Examples of the processing circuit 2210 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 2210 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 2210 are for illustration and other suitable configurations within the scope of the disclosure are also contemplated.

According to one or more aspects of the disclosure, the processing circuit 2210 may be adapted to perform any or all of the features, processes, functions, operations and/or routines for any or all of the apparatuses described herein. For example, the processing circuit 2210 may be configured to perform any of the steps, functions, and/or processes described with respect to FIGS. 1-9 and 23-27. As used herein, the term "adapted" in relation to the processing circuit 2210 may refer to the processing circuit 2210 being one or more of configured, employed, implemented, and/or programmed to perform a particular process, function, operation and/or routine according to various features described herein.

The processing circuit 2210 may be a specialized processor, such as an application specific integrated circuit (ASIC) that serves as a means for (e.g., structure for) carrying out any one of the operations described in conjunction with FIGS. 1-9 and 23-27. The processing circuit 2210 serves as one example of a means for transmitting and/or a means for receiving.

According to at least one example of the apparatus 2200, the processing circuit 2210 may include one or more of a circuit/module for establishing a first communication link 2220, a circuit/module for receiving a request 2222, a circuit/module for establishing a second communication link 2224, a circuit/module for establishing a relay link 2226, a circuit/module for communicating via a relay link 2228, a circuit/module for determining whether information is to be communicated 2230, a circuit/module for determining whether to communicate 2232, a circuit/module for receiving a response 2234, or a circuit/module for forwarding information 2236.

The circuit/module for establishing a first communication link 2220 may include circuitry and/or programming (e.g., code for establishing a first communication link 2238 stored on the storage medium 2204) adapted to perform several functions relating to, for example, establishing a first communication link between a first base station that includes circuitry for a first radio access technology (RAT) and an access terminal. In some implementations, the circuit/module for establishing a first communication link 2220 communicates with an access terminal (e.g., a UE) to establish wide area network communication for the access terminal In some implementations, a message is received from the access terminal (e.g., on a discovery channel or some other channel) to initiate establishment of a communication link with the access terminal A response to this request may then be sent indicating whether the link can be established. In conjunction with this communication, one or more parameters for the link may be negotiated.

The circuit/module for receiving a request 2222 may include circuitry and/or programming (e.g., code for receiving a request 2240 stored on the storage medium 2204) adapted to perform several functions relating to, for example, receiving a request from the access terminal for the first base station to establish a relay link through the first base station between the access terminal and a second base station that includes circuitry for a second RAT different from the first RAT. Initially, the circuit/module for receiving a request 2222 obtains received information corresponding to the request. For example, the circuit/module for receiving a request 2222 may obtain this information from a component of the apparatus (e.g., the receiver 1016, the memory device 1008, or some other component) or directly from a device (e.g., an access terminal) that transmitted the information. In some implementations, the circuit/module for receiving a request 2222 identifies a memory location of a value in the memory device 1008 and invokes a read of that location. In some implementations, the circuit/module for receiving a request 2222 processes (e.g., decodes) the received information. The circuit/module for receiving a request 2222 then outputs the received information (e.g., stores the indication in the memory device 1008 or sends the parameter(s) to another component of the apparatus 1000). In some implementations, the receiver 1016 includes the circuit/module for receiving a request 2222 and/or the code for receiving a request 2240.

The circuit/module for establishing a second communication link 2224 may include circuitry and/or programming (e.g., code for establishing a second communication link 2242 stored on the storage medium 2204) adapted to perform several functions relating to, for example, establishing a second communication link with the second base station. In some implementations, the circuit/module for establishing a second communication link 2224 communicates with a base station (e.g., a mmW base station) to establish a connection between different networks (e.g., an LTE network and a mmW network). For example, the circuit/module for establishing a second communication link 2224 may negotiate with the base station to set up an X2 interface or another type of interface. In some implementations, a message (e.g., a request) is sent to the base station (e.g., on a backhaul channel or some other channel) to initiate establishment of a communication link with the base station. A response to this message may then be received from the base station indicating whether the link can be established. In conjunction with this communication, one or more parameters for the link may be negotiated.

The circuit/module for establishing a relay link 2226 may include circuitry and/or programming (e.g., code for establishing a relay link 2244 stored on the storage medium 2204) adapted to perform several functions relating to, for example, establishing a relay link via the first communication link and the second communication link. In conjunction with establishing the relay link, the circuit/module for establishing a relay link 2226 sends an indication to the access terminal and sends an indication to the second base station, informing each of these entities that the relay link has been established. In some implementations, the circuit/module for establishing a relay link 2226 establishes the relay link in response to a request from an access terminal (e.g., a UE).

The circuit/module for communicating via a relay link 2228 may include circuitry and/or programming (e.g., code for communicating via a relay link 2246 stored on the storage medium 2204) adapted to perform several functions relating to, for example, communicating information between the access terminal and the second base station via the relay link. In some implementations, the communicating involves receiving information from a component of the apparatus 2200 (e.g., the receiver 2216 or the memory device 2208). In some implementations, the communicating involves sending information directly to an ultimate destination (e.g., if the circuit/module for communicating via a relay link 2228 includes a transmitter) or sending the information to another component of the apparatus 2200 (e.g., the transmitter 2214) for transmission to another device. In some implementations, the communication interface 2202 includes the circuit/module for communicating via a relay link 2228 and/or the code for communicating via a relay link 2246.

The circuit/module for determining whether information is to be communicated 2230 may include circuitry and/or programming (e.g., code for determining whether information is to be communicated 2248 stored on the storage medium 2204) adapted to perform several functions relating to, for example, determining whether information received from the second base station is to be communicated to the access terminal via the first communication link or determining whether information received from the access terminal is to be communicated to the second base station via the second communication link. Initially, the circuit/module for determining whether information is to be communicated 2230 identifies the destination of the received information. The circuit/module for determining whether information is to be communicated 2230 then determines, based on the destination, whether to communicate the information to the access terminal, the second base station, or some other entity. That is, the circuit/module for determining whether information is to be communicated 2230 determines whether to relay information between the second access point and the access terminal or vice versa; or whether the information is to be sent elsewhere. The circuit/module for determining whether information is to be communicated 2230 then sends an indication of the determination (e.g., an indication of where to send the information or a yes/no indication) to a component of the apparatus 2200 (e.g., the memory device 2208 or some other component).

The circuit/module for determining whether to communicate 2232 may include circuitry and/or programming (e.g., code for determining whether to communicate 2250 stored on the storage medium 2204) adapted to perform several functions relating to, for example, determining whether to communicate with the access terminal via the relay link as a result of a determination of whether information received from the second base station is to be communicated to the access terminal via the first communication link or as a result of a determination of whether information received from the access terminal is to be communicated to the second base station. Initially, the circuit/module for determining whether to communicate 2232 receives an indication of the determination by the circuit/module for determining whether information is to be communicated 2230. The circuit/module for determining whether to communicate 2232 then determines, based on the indication, whether to communicate the information via the first communication link, the second communication link, or some other link. The circuit/module for determining whether to communicate 2232 may then send an indication of the determination (e.g., where to send the information) to a component of the apparatus 2200 (e.g., the memory device 2208, the communication interface 2202, or some other component) to invoke the communication.

The circuit/module for receiving a response 2234 may include circuitry and/or programming (e.g., code for receiving a response 2252 stored on the storage medium 2204) adapted to perform several functions relating to, for example, receiving a response to information communicated via the first communication link or the second communication link. Initially, the circuit/module for receiving a response 2234 obtains received information. For example, the circuit/module for receiving a response 2234 may obtain this information from a component of the apparatus (e.g., the receiver 2216, the memory device 2208, or some other component) or directly from a device (e.g., an access terminal or access point) that transmitted the parameter(s). In some implementations, the circuit/module for receiving a response 2234 identifies a memory location of a value in the memory device 2208 and invokes a read of that location. In some implementations, the circuit/module for receiving a response 2234 processes (e.g., decodes) the received information. The circuit/module for receiving a response 2234 then outputs the received information (e.g., stores the response in the memory device 2208 or sends the response to another component of the apparatus 2200). In some implementations, the receiver 2216 includes the circuit/module for receiving a response 2234 and/or the code for receiving a response 2252.

The circuit/module for forwarding information 2236 may include circuitry and/or programming (e.g., code for forwarding information 2254 stored on the storage medium 2204) adapted to perform several functions relating to, for example, forwarding information based on the response received via the second communication link or the first communication link. Information received via the second communication link may be forwarded via the first communication link. Conversely, information received via the first communication link may be forwarded via the second communication link. Initially, the circuit/module for forwarding information 2236 receives an indication of the response received by the circuit/module for receiving a response 2234. The circuit/module for forwarding information 2236 then determines information to be forwarded based on the response. For example, the response itself could be forwarded or information based on the response could be forwarded. The circuit/module for forwarding information 2236 then sends the information to a component of the apparatus 2200 (e.g., the transmitter 2214 or some other component). In some implementations, the communication interface 2202 includes the circuit/module for forwarding information 2236 and/or the code for forwarding information 2254.

As mentioned above, programming stored by the storage medium 2204, when executed by the processing circuit 2210, causes the processing circuit 2210 to perform one or more of the various functions and/or process operations described herein. For example, the programming, when executed by the processing circuit 2210, may cause the processing circuit 2210 to perform the various functions, steps, and/or processes described herein with respect to FIGS. 1-9 and 23-27 in various implementations. As shown in FIG. 22, the storage medium 2204 may include one or more of the code establishing a first communication link 2238, the code for receiving a request 2240, the code for establishing a second communication link 2242, the code for establishing a relay link 2244, the code for communicating via a relay link 2246, the code for determining whether information is to be communicated 2248, the code for determining whether to communicate 2250, the code for receiving a response 2252, or the code for forwarding information 2254.

Example Processes

Figure 23:
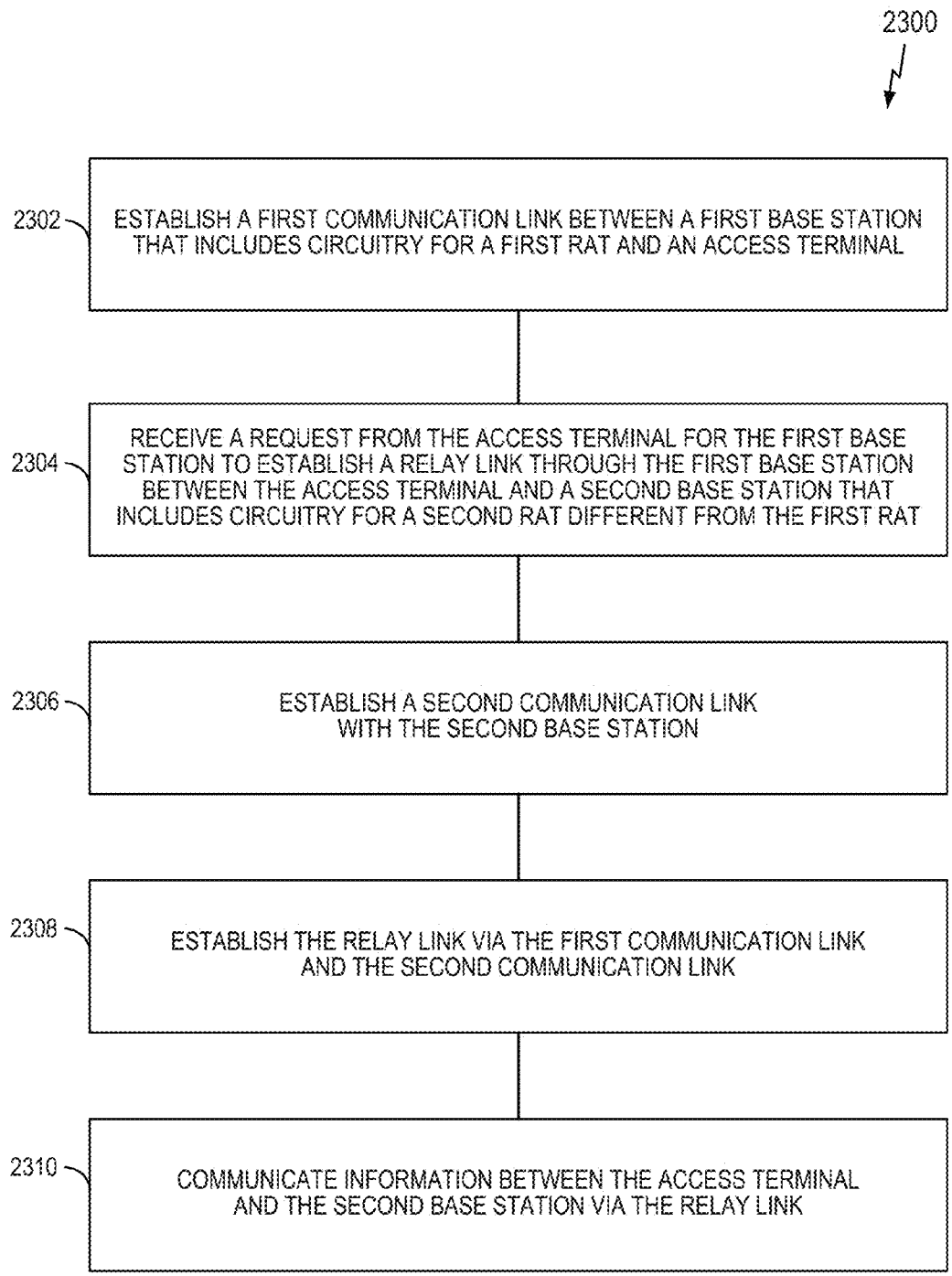
FIG. 23 illustrates an example of a process for establishing relay link communication in accordance with some aspects of the disclosure.

FIG. 23 illustrates a process 2300 for communication in accordance with some aspects of the disclosure. The process 2300 may take place within a processing circuit (e.g., the processing circuit 2210 of FIG. 22), which may be located in a base station, a mobile device, or some other suitable apparatus. Of course, in various aspects within the scope of the disclosure, the process 2300 may be implemented by any suitable apparatus capable of supporting communication-related operations.

At block 2302, an apparatus (e.g., a base station) establishes a first communication link between a first base station that includes circuitry for a first radio access technology (RAT) and an access terminal. In some aspects, the first RAT includes long term evolution (LTE) technology. For example, the operations of block 2302 may involve an LTE base station establishing an LTE link with a UE.

At block 2304, the apparatus receives a request from the access terminal. This request is for the first base station to establish a relay link through the first base station between the access terminal and a second base station that includes circuitry for a second RAT different from the first RAT.

At block 2306, the apparatus establishes a second communication link with the second base station. In some aspects, the second communication link includes an X2 interface. The first RAT may have higher reliability than the second RAT. In addition, the second RAT may have higher throughput than the first RAT. In some aspects, the second RAT includes millimeter wave (mmW) technology. Thus, in some implementations, the operations of block 2306 involve an LTE base station establishing an X2 interface with a mmW base station.

At block 2308, the apparatus establishes the relay link via the first communication link and the second communication link. For example, in some implementations, an LTE base station establishes a relay link over an LTE link to a UE and an X2 interface to a mmW base station.

At block 2310, the apparatus communicates information between the access terminal and the second base station via the relay link. In some aspects, the communicating includes transmitting information and/or receiving information. In some aspects, the communicating includes communicating beamforming information. In some aspects, the beamforming information includes antenna amplitude information and/or antenna phase information. In some aspects, the communicating includes communicating at least one of: control information, beam search results, a scheduling request, a request to switch beamforming direction, periodic control link information, on-demand control link information, beamforming training information, or handover information. In some aspects, the communicating via the relay link includes communicating information via a data channel established on the first communication link. In some aspects, the communicating via the relay link includes communicating information via a control channel established on the first communication link.

Figure 24:
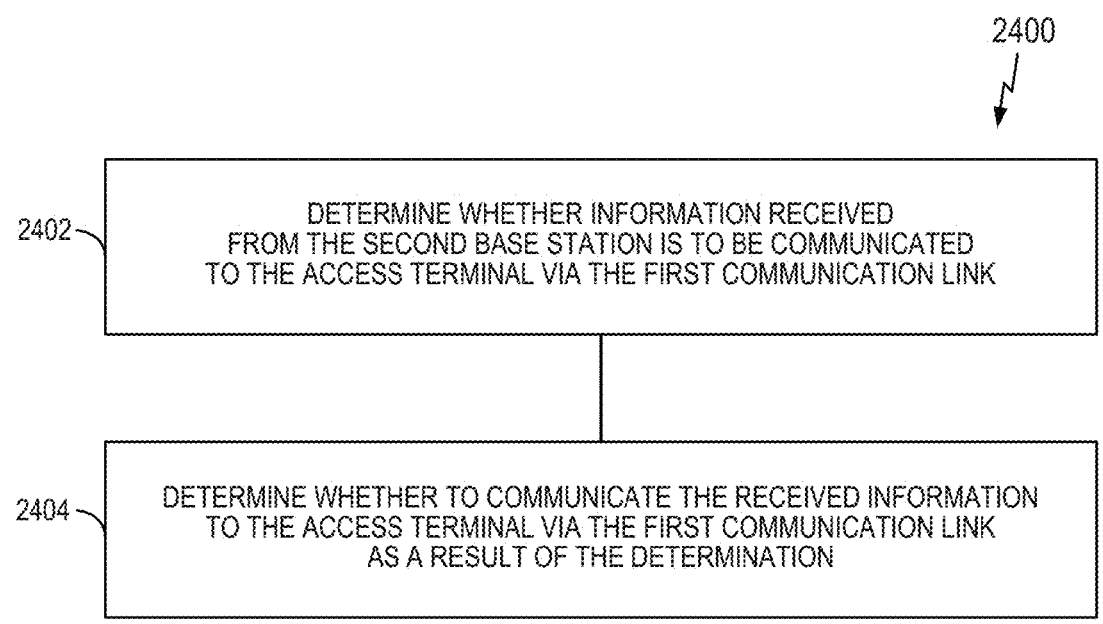
FIG. 24 illustrates an example of a process for selective relay link communication in accordance with some aspects of the disclosure.
Figure 25:
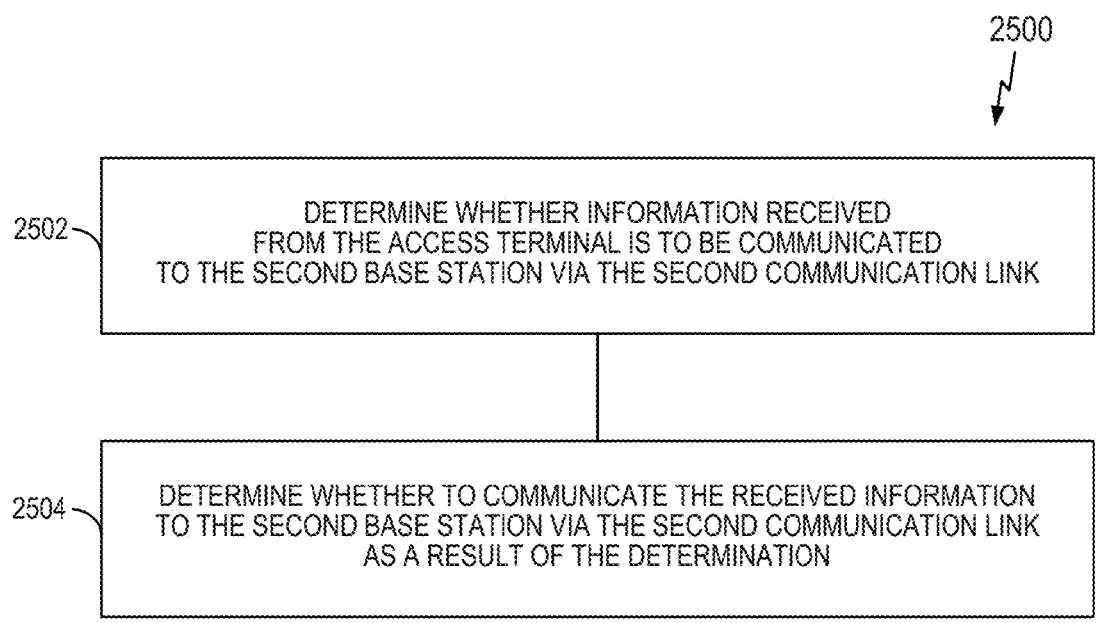
FIG. 25 illustrates another example of a process for selective relay link communication in accordance with some aspects of the disclosure.

FIG. 24 illustrates a process 2400 for communication in accordance with some aspects of the disclosure. The process 2400 may be employed in conjunction with the process 2300 of FIG. 23. The process 2400 may take place within a processing circuit (e.g., the processing circuit 2210 of FIG. 22), which may be located in a base station, a mobile device, or some other suitable apparatus. Of course, in various aspects within the scope of the disclosure, the process 2400 may be implemented by any suitable apparatus capable of supporting communication-related operations.

At block 2402, an apparatus (e.g., a base station) determines whether information received from the base station is to be communicated to the access terminal via the first communication link. For example, in some implementations, an LTE base station determines where to route information received from a mmW base station.

At block 2404, the apparatus determines whether to communicate the received information to the access terminal via the first communication link as a result of the determination of block 2402. For example, in some implementations, an LTE base station determines whether information received from a mmW base station and destined for an UE should be routed to the UE.

FIG. 21 illustrates a process 2100 for communication in accordance with some aspects of the disclosure. The process 2100 may be employed in conjunction with the process 2300 of FIG. 23. The process 2100 may take place within a processing circuit (e.g., the processing circuit 2210 of FIG. 22), which may be located in a base station, a mobile device, or some other suitable apparatus. Of course, in various aspects within the scope of the disclosure, the process 2100 may be implemented by any suitable apparatus capable of supporting communication-related operations.

At block 2502, an apparatus (e.g., a base station) determines whether information received from the access terminal is to be communicated to the base station via the second communication link. For example, in some implementations, an LTE base station determines where to route information received from a UE.

At block 2504, a determination of whether to communicate the received information to the base station via the second communication link may be made as a result of the determination of block 2502. For example, in some implementations, an LTE base station determines whether information received from a UE and destined for a mmW base station should be routed to the mmW base station.

Figure 26:
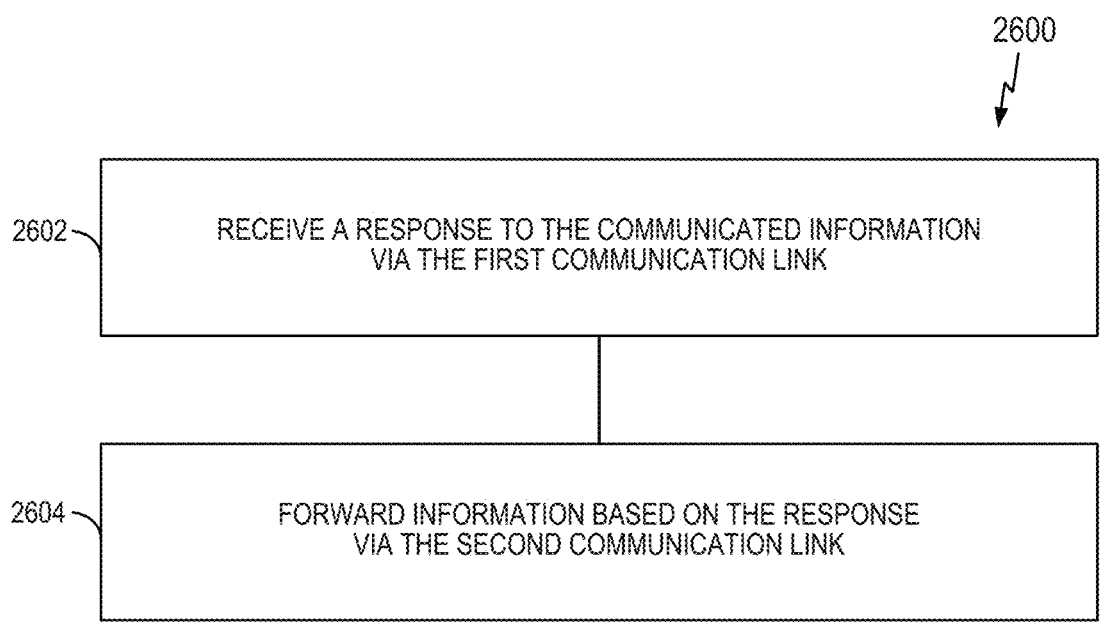
FIG. 26 illustrates an example of a process for forwarding information in accordance with some aspects of the disclosure.

FIG. 26 illustrates a process 2600 for communication in accordance with some aspects of the disclosure. The process 2600 may be employed in conjunction with the process 2300 of FIG. 23. The process 2600 may take place within a processing circuit (e.g., the processing circuit 2210 of FIG. 22), which may be located in a base station, a mobile device, or some other suitable apparatus. Of course, in various aspects within the scope of the disclosure, the process 2600 may be implemented by any suitable apparatus capable of supporting communication-related operations.

At block 2602, an apparatus (e.g., a base station) receives, via the first communication link, a response to information that was communicated. For example, in some implementations, an LTE base station receives a response to information communicated at block 2404 of FIG. 24.

At block 2604, information based on the response may be forwarded via the second communication link. For example, in some implementations where an LTE base station receives a response from a UE over an LTE link, the LTE base station sends the response and/or other information related to the response to a mmW base station via an X2 interface.

Figure 27:
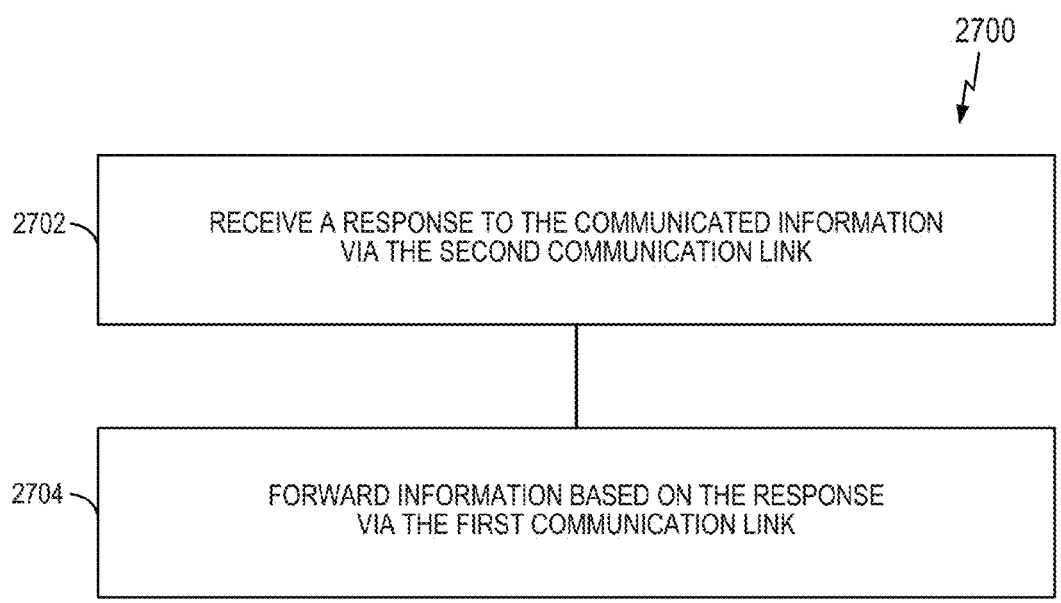
FIG. 27 illustrates an example of a process for message and response communication in accordance with some aspects of the disclosure.

FIG. 27 illustrates a process 2700 for communication in accordance with some aspects of the disclosure. The process 2700 may be employed in conjunction with the process 2300 of FIG. 23. The process 2700 may take place within a processing circuit (e.g., the processing circuit 2210 of FIG. 22), which may be located in a base station, a mobile device, or some other suitable apparatus. Of course, in various aspects within the scope of the disclosure, the process 2700 may be implemented by any suitable apparatus capable of supporting communication-related operations.

At block 2702, an apparatus (e.g., a base station) receives, via the second communication link, a response to information that was communicated. For example, in some implementations, an LTE base station receives a response to information communicated at block 2504 of FIG. 25.

At block 2704, the apparatus forwards information based on the response via the first communication link. For example, in some implementations where an LTE base station receives a response from a mmW base station via an X2 interface, the LTE base station sends the response and/or other information related to the response to a UE over an LTE link.

Additional Example Processes

Figure 28:
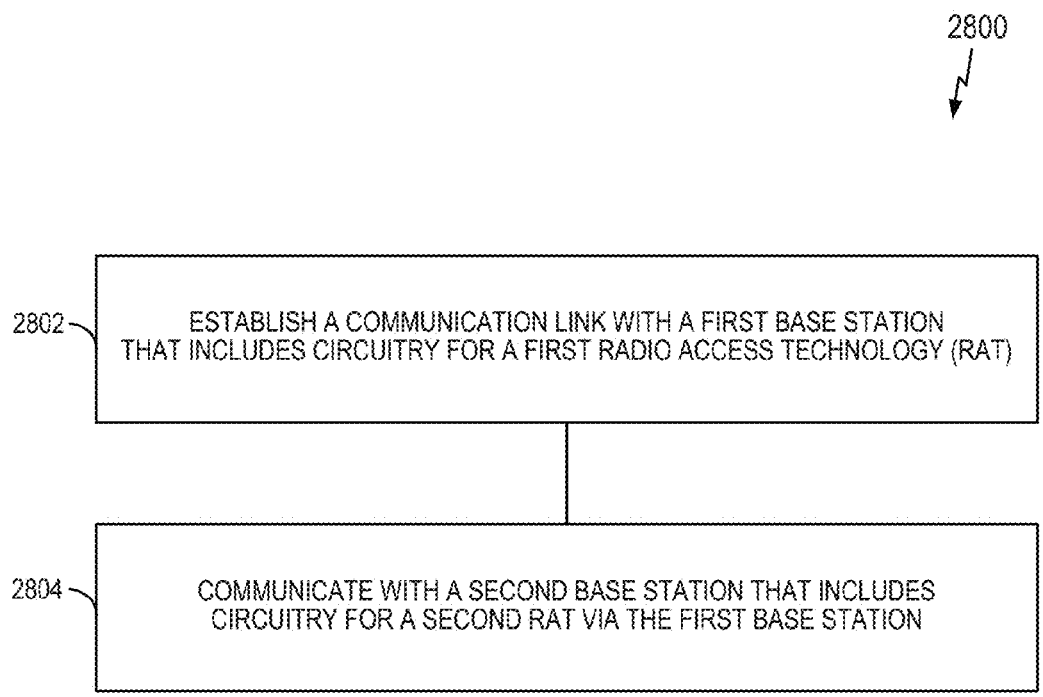
FIG. 28 illustrates an example of a process for supporting multi-RAT communication in accordance with some aspects of the disclosure.

FIG. 28 illustrates a process 2800 for communication in accordance with some aspects of the disclosure. The process 2800 may take place within a processing circuit (e.g., the processing circuit 1010 of FIG. 10), which may be located in a base station, a mobile device, or some other suitable apparatus. Of course, in various aspects within the scope of the disclosure, the process 2800 may be implemented by any suitable apparatus capable of supporting communication-related operations.

At block 2802, a communication link is established with a first base station that includes circuitry for a first radio access technology (RAT). In some aspects, the first RAT includes long term evolution (LTE) technology.

At block 2804, communication is conducted with a second base station that includes circuitry for a second RAT. This communication is via the first base station. In some aspects, the second RAT includes millimeter wave (mmW) technology.

In some aspects, the communicating is via an X2 interface between the first base station and the second base station. In some aspects, the communicating with a second base station includes communicating information via a data channel established on the communication link with the first base station. In some aspects, the communicating with a second base station includes communicating information via a control channel established on the communication link with the first base station.

Figure 29:
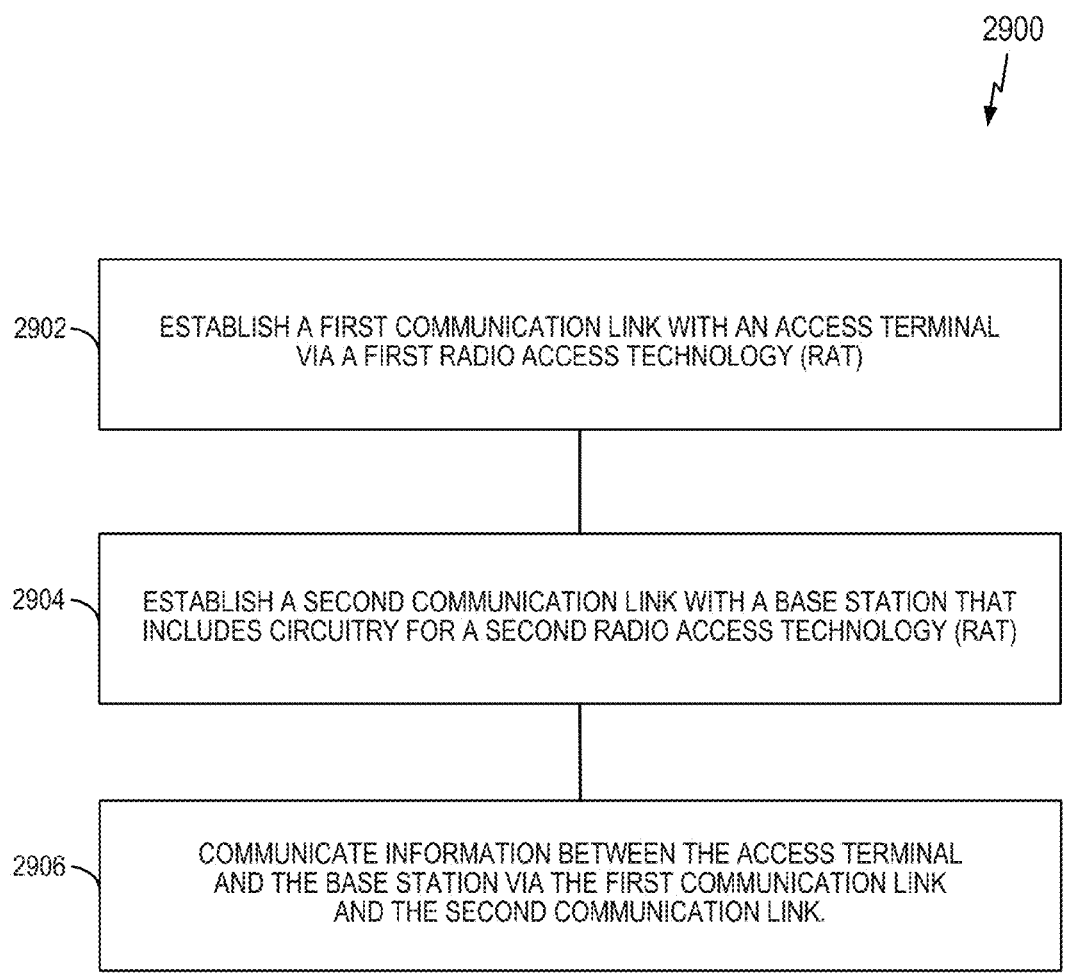
FIG. 29 illustrates another example of a process for supporting multi-RAT communication in accordance with some aspects of the disclosure.

FIG. 29 illustrates a process 2900 for communication in accordance with some aspects of the disclosure. The process 2900 may take place within a processing circuit (e.g., the processing circuit 2210 of FIG. 22), which may be located in a base station, a mobile device, or some other suitable apparatus. Of course, in various aspects within the scope of the disclosure, the process 2900 may be implemented by any suitable apparatus capable of supporting communication-related operations.

At block 2902, a first communication link is established with an access terminal via a first radio access technology (RAT). In some aspects, the first RAT includes long term evolution (LTE) technology.

At block 2904, a second communication link is established with a base station that includes circuitry for a second radio access technology (RAT). In some aspects, the second communication link includes an X2 interface. In some aspects, the second RAT includes millimeter wave (mmW) technology.

At block 2906, information is communicated between the access terminal and the base station via the first communication link and the second communication link.

In some aspects, a determination is made as to whether information received from the base station is to be communicated to the access terminal via the first communication link. In this case, an election to communicate the received information to the access terminal via the first communication link may be made as a result of the determination.

In some aspects, a determination is made as to whether information received from the access terminal is to be communicated to the base station via the second communication link. In this case, an election to communicate the received information to the base station via the second communication link may be made as a result of the determination.

In some aspects, a response to the communicated information is received via the first communication link. In this case, information based on the response may be forwarded via the second communication link.

In some aspects, a response to the communicated information is received via the second communication link. In this case, information based on the response may be forwarded via the first communication link.

Figure 30:
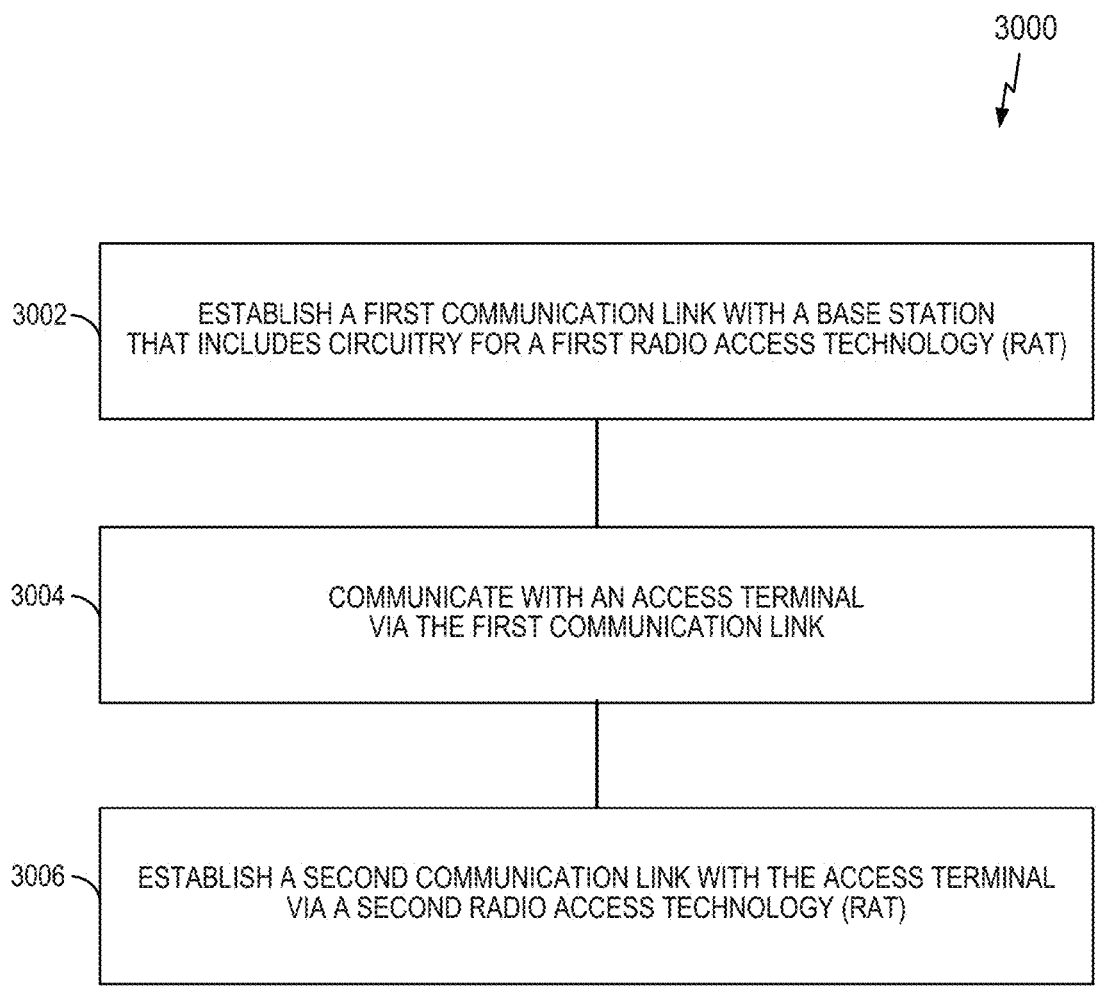
FIG. 30 illustrates another example of a process for supporting multi-RAT communication in accordance with some aspects of the disclosure.

FIG. 30 illustrates a process 3000 for communication in accordance with some aspects of the disclosure. The process 3000 may take place within a processing circuit (e.g., the processing circuit 1510 of FIG. 15), which may be located in a base station, a mobile device, or some other suitable apparatus. Of course, in various aspects within the scope of the disclosure, the process 3000 may be implemented by any suitable apparatus capable of supporting communication-related operations.

At block 3002, a first communication link is established with a base station that includes circuitry for a first radio access technology (RAT). In some aspects, the first RAT includes long term evolution (LTE) technology. In some aspects, the first communication link includes an X2 interface.

At block 3004, communication with an access terminal is conducted via the first communication link.

In some aspects, the communication includes a communication from the access terminal. In this case, a response may be sent to the access terminal via the first communication link.

At block 3006, a second communication link with the access terminal is established via a second radio access technology (RAT). In some aspects, the second RAT includes millimeter wave (mmW) technology.

In some aspects, the communication includes a communication from the access terminal. In this case, a response may be sent to the access terminal via the second communication link.

In some aspects, the communication includes receiving information. In this case, a parameter of the second communication link may be set based on the received information. Alternatively, or in addition, an action relating to the second communication link may be performed as a result of receiving the information.

Additional Aspects

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while example implementations may have been discussed herein as device, system, or method implementations, it should be understood that such example implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. In some aspects, a process may correspond to a method, a function, a procedure, a subroutine, a subprogram, etc. When a process corresponds to a function, its termination corresponds to a return of the function to the calling function or the main function. One or more of the various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" or "one or more of" a list of items refers to any combination of those items, including single members. As an example, "at least one of: a, b, or c" is intended to cover: a; b; c; a and b; a and c; b and c; a, b and c; 2a; 2b; 2c; 2a and b; a and 2b, 2a and 2b; and so on. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. An apparatus for communication, comprising:
   a memory device; and
   a processing circuit coupled to the memory device and configured to:
      establish a communication link between an access terminal and a first base station that includes circuitry for a first radio access technology (RAT);
      send a request to the first base station to establish a relay link through the first base station between the access terminal and a second base station that includes circuitry for a second RAT different from the first RAT; and
      communicate with the second base station via the relay link through the first base station, wherein the communication with the second base station includes communication of beamforming information via the relay link.

2. The apparatus of claim 1, wherein the beamforming information comprises antenna amplitude information and/or antenna phase information.

3. The apparatus of claim 1, wherein the second RAT comprises millimeter wave (mmW) technology.

4. The apparatus of claim 3, wherein the first RAT comprises long term evolution (LTE) technology.

5. The apparatus of claim 4, wherein the relay link is established via an X2 interface between the first base station and the second base station.

6. The apparatus of claim 1, wherein the processing circuit is further configured to communicate, via the relay link, at least one of: control information, beam search results, a scheduling request, a request to switch beamforming direction, periodic control link information, on-demand control link information, beamforming training information, or handover information.

7. The apparatus of claim 1, wherein the processing circuit is further configured to:
   determine whether information to be communicated is time sensitive; and
   determine whether to communicate with the second base station via the relay link as a result of the determination.

8. The apparatus of claim 1, wherein the processing circuit is further configured to:
   send a message to the second base station via the relay link; and
   receive a response to the message via the relay link.

9. The apparatus of claim 1, wherein the processing circuit is further configured to:
   send a message to the second base station via the relay link;
   establish another communication link with the second base station; and
   receive a response to the message via the other communication link.

10. The apparatus of claim 1, wherein the processing circuit is further configured to communicate with the second base station via a data channel established on the communication link with the first base station.

11. The apparatus of claim 1, wherein the processing circuit is further configured to communicate with the second base station via a control channel established on the communication link with the first base station.

12. A method of communication, comprising:
    establishing a communication link between an access terminal and a first base station that includes circuitry for a first radio access technology (RAT);
    sending a request to the first base station to establish a relay link through the first base station between the access terminal and a second base station that includes circuitry for a second RAT different from the first RAT; and
    communicating with the second base station via the relay link through the first base station, wherein the communicating with the second base station includes communicating beamforming information via the relay link.

13. The method of claim 12, wherein the beamforming information comprises antenna amplitude information and/or antenna phase information.

14. The method of claim 12, wherein the communicating comprises communicating at least one of: control information, beam search results, a scheduling request, a request to switch beamforming direction, periodic control link information, on-demand control link information, beamforming training information, or handover information.

15. The method of claim 12, further comprising:
    determining whether information to be communicated is time sensitive; and
    determining whether to communicate with the second base station via the relay link as a result of the determination.

16. The method of claim 12, wherein:
    the communicating comprises sending a message to the second base station; and
    the method further comprises establishing another communication link with the second base station; and
    the method further comprises receiving a response to the message via the other fcommunication link.

17. An apparatus for communication, comprising:
    means for establishing a communication link between an access terminal and a first base station that includes circuitry for a first radio access technology (RAT);
    means for sending a request to the first base station to establish a relay link through the first base station between the access terminal and a second base station that includes circuitry for a second RAT different from the first RAT; and
    means for communicating with the second base station via the relay link through the first base station, wherein the communicating with the second base station includes communicating beamforming information via the relay link.

18. A non-transitory computer-readable medium storing computer-executable code, including code to:
    establish a communication link between an access terminal and a first base station that includes circuitry for a first radio access technology (RAT);
    send a request to the first base station to establish a relay link through the first base station between the access terminal and a second base station that includes circuitry for a second RAT different from the first RAT; and
    communicate with the second base station via the relay link through the first base station, wherein the communication with the second base station includes communication of beamforming information via the relay link.

19. An apparatus for communication, comprising:
    a memory device; and
    a processing circuit coupled to the memory device and configured to:
        establish a first communication link between a first base station that includes circuitry for a first radio access technology (RAT) based on millimeter wave (mmW) signaling and a second base station that includes circuitry for a second radio access technology (RAT) different from the first RAT;
        receive an indication that a relay link between the first base station and an access terminal is established via the first communication link;
        communicate with the access terminal via the relay link; and
        establish a second communication link with the access terminal via the first RAT.

20. The apparatus of claim 19, wherein the processing circuit is further configured to communicate beamforming information via the relay link.

21. The apparatus of claim 19, wherein the first communication link comprises an X2 interface.

22. The apparatus of claim 19, wherein the processing circuit is further configured to communicate, via the relay link, at least one of: control information, beam search results, a scheduling request, a request to switch beamforming direction, periodic control link information, on-demand control link information, beamforming training information, or handover information.

23. The apparatus of claim 19, wherein the processing circuit is further configured to:
    determine whether information to be communicated is time sensitive; and
    determine whether to communicate with the access terminal via the relay link as a result of the determination.

24. The apparatus of claim 19, wherein the processing circuit is further configured to:
    receive a message from the access terminal via the relay link; and
    send a response to the message to the access terminal via the second communication link.

25. The apparatus of claim 19, wherein the processing circuit is further configured to:
    receive information via the relay link; and
    set a parameter of the second communication link based on the received information.

26. The apparatus of claim 19, wherein the processing circuit is further configured to:
    receive information via the relay link; and
    perform an action relating to the second communication link as a result of the receipt of the information.

27. A method of communication, the method comprising:
    establishing a first communication link between a first base station that includes circuitry for a first radio access technology (RAT) based on millimeter wave (mmW) signaling and a second base station that includes circuitry for a second radio access technology (RAT) different from the first RAT;
    receiving an indication that a relay link between the first base station and an access terminal is established via the first communication link;
    communicating with the access terminal via the relay link; and
    establishing a second communication link with the access terminal via the first RAT.

28. The method of claim 27, wherein the communicating comprises communicating beamforming information.

29. The method of claim 27, wherein:
the communicating comprises receiving information; and
the method further comprises setting a parameter of the second communication link based on the received information.

30. The method of claim 27, wherein:
the communicating comprises receiving information; and
the method further comprises performing an action relating to the second communication link as a result of receiving the information.

31. An apparatus for communication, comprising:
means for establishing a first communication link between a first base station that includes circuitry for a first radio access technology (RAT) based on millimeter wave (mmW) signaling and a second base station that includes circuitry for a second radio access technology (RAT) different from the first RAT;
means for receiving an indication that a relay link between the first base station and an access terminal is established via the first communication link;
means for communicating with the access terminal via the relay link; and
means for establishing a second communication link with the access terminal via the first RAT.

32. A non-transitory computer-readable medium storing computer-executable code, including code to:
establish a first communication link between a first base station that includes circuitry for a first radio access technology (RAT) based on millimeter wave (mmW) signaling and a second base station that includes circuitry for a second radio access technology (RAT) different from the first RAT;
receive an indication that a relay link between the first base station and an access terminal is established via the first communication link;
communicate with the access terminal via the relay link; and
establish a second communication link with the access terminal via the first RAT.

33. An apparatus for communication, comprising:
a memory device; and
a processing circuit coupled to the memory device and configured to:
establish a first communication link between a first base station that includes circuitry for a first radio access technology (RAT) and an access terminal;
receive a request from the access terminal for the first base station to establish a relay link through the first base station between the access terminal and a second base station that includes circuitry for a second RAT different from the first RAT;
establish a second communication link with the second base station;
establish the relay link via the first communication link and the second communication link; and
communicate information between the access terminal and the second base station via the relay link, wherein the information includes beamforming information.

34. The apparatus of claim 33, wherein the processing circuit is further configured to communicate, via the relay link, at least one of: control information, beam search results, a scheduling request, a request to switch beamforming direction, periodic control link information, on-demand control link information, beamforming training information, or handover information.

35. The apparatus of claim 33, wherein the processing circuit is further configured to:
determine whether information received from the second base station is to be communicated to the access terminal via the first communication link; and
determine whether to communicate the received information to the access terminal via the first communication link as a result of the determination.

36. The apparatus of claim 33, wherein the processing circuit is further configured to:
determine whether information received from the access terminal is to be communicated to the second base station via the second communication link; and
determine whether to communicate the received information to the second base station via the second communication link as a result of the determination.

37. The apparatus of claim 33, wherein the processing circuit is further configured to:
receive a response to the communicated information via the first communication link; and
forward information based on the response received via the second communication link.

38. The apparatus of claim 33, wherein the processing circuit is further configured to:
receive a response to the communicated information via the second communication link; and
forward information based on the response received via the first communication link.

39. A method of communication, comprising:
establishing a first communication link between a first base station that includes circuitry for a first radio access technology (RAT) and an access terminal;
receiving a request from the access terminal for the first base station to establish a relay link through the first base station between the access terminal and a second base station that includes circuitry for a second RAT different from the first RAT;
establishing a second communication link with the second base station;
establishing the relay link via the first communication link and the second communication link; and
communicating information between the access terminal and the second base station via the relay link, wherein the information includes beamforming information.

40. The method of claim 39, further comprising:
determining whether information received from the second base station is to be communicated to the access terminal via the first communication link; and
determining whether to communicate the received information to the access terminal via the first communication link as a result of the determination.

41. The method of claim 39, further comprising:
determining whether information received from the access terminal is to be communicated to the second base station via the second communication link; and
determining whether to communicate the received information to the second base station via the second communication link as a result of the determination.

42. The method of claim 39, further comprising:
receiving a response to the communicated information via the first communication link; and
forwarding information based on the response via the second communication link.

43. The method of claim 39, further comprising:
receiving a response to the communicated information via the second communication link; and
forwarding information based on the response via the first communication link.

44. An apparatus for communication, comprising:
- means for establishing a first communication link between a first base station that includes circuitry for a first radio access technology (RAT) and an access terminal;
- means for receiving a request from the access terminal for the first base station to establish a relay link through the first base station between the access terminal and a second base station that includes circuitry for a second RAT different from the first RAT;
- means for establishing a second communication link with the second base station;
- means for establishing the relay link via the first communication link and the second communication link; and
- means for communicating information between the access terminal and the second base station via the relay link, wherein the information includes beamforming information.

45. A non-transitory computer-readable medium storing computer-executable code, including code to:
- establish a first communication link between a first base station that includes circuitry for a first radio access technology (RAT) and an access terminal;
- receive a request from the access terminal for the first base station to establish a relay link through the first base station between the access terminal and a second base station that includes circuitry for a second RAT different from the first RAT;
- establish a second communication link with the second base station;
- establish the relay link via the first communication link and the second communication link; and
- communicate information between the access terminal and the second base station via the relay link, wherein the information includes beamforming information.

* * * * *